(12) United States Patent
Suginohara et al.

(10) Patent No.: US 8,682,132 B2
(45) Date of Patent: Mar. 25, 2014

(54) METHOD AND DEVICE FOR DETECTING MUSIC SEGMENT, AND METHOD AND DEVICE FOR RECORDING DATA

(75) Inventors: Hidetsugu Suginohara, Tokyo (JP); Isao Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1102 days.

(21) Appl. No.: 12/300,325

(22) PCT Filed: Jan. 9, 2007

(86) PCT No.: PCT/JP2007/050069
§ 371 (c)(1),
(2), (4) Date: Nov. 10, 2008

(87) PCT Pub. No.: WO2007/132569
PCT Pub. Date: Nov. 22, 2007

(65) Prior Publication Data
US 2010/0232765 A1    Sep. 16, 2010

(30) Foreign Application Priority Data

May 11, 2006 (JP) ................................. 2006-132898

(51) Int. Cl.
*H04N 5/765* (2006.01)
*H04N 5/931* (2006.01)

(52) U.S. Cl.
USPC .......................................... 386/200; 386/204

(58) Field of Classification Search
None
See application file for complete search history.

(56) References Cited

U.S. PATENT DOCUMENTS 5,298,674 A    3/1994  Yun et al.
(Continued)

FOREIGN PATENT DOCUMENTS

EP    1 150 446 A2    10/2001
JP    05-088695        4/1993
(Continued)

OTHER PUBLICATIONS

Otsuka et al., A highlight scene detection and video summarization system using audio feature for a personal video recorder, 2005, Digest of technical papers, International Conference on Consumer Electronics, (IEEE Cat. No. 05CH37619) IEEE Piscataway, NJ, USA, Jan. 8, 2005.

(Continued)

*Primary Examiner* — William C Vaughn, Jr.
*Assistant Examiner* — Oluwaseun A Adegeye
(74) *Attorney, Agent, or Firm* — Birch, Stewart, Kolasch & Birch, LLP

(57) ABSTRACT

[Problem] The present invention provides a method of detecting a music scene with a high accuracy from a television broadcast.
[Means for solution] The music-segment detection method provided with a data input step of inputting data including an audio signal and a video signal; a plurality of candidate-music-segment detection steps of detecting, from the audio signal, respective candidate music-segments in the input data, based on criteria different from each other; a change-point detection step of detecting a change point in the input data, based on a distinctive change in the audio signal and/or on a distinctive change in a video signal; and a music-segment detection step of detecting a music segment, based on the plurality of detected candidate-music-segments and on the detected change point.

12 Claims, 16 Drawing Sheets

(56) References Cited

U.S. PATENT DOCUMENTS

| | | | |
|---|---|---|---|
| 5,375,188 A | 12/1994 | Serikawa et al. | |
| 5,712,953 A | 1/1998 | Langs | |
| 5,794,194 A | 8/1998 | Takebayashi et al. | |
| 6,525,255 B1 | 2/2003 | Funaki | |
| 7,336,890 B2* | 2/2008 | Lu et al. | 386/239 |
| 7,386,217 B2* | 6/2008 | Zhang | 386/248 |
| 7,626,111 B2 | 12/2009 | Kim et al. | |
| 2002/0152207 A1 | 10/2002 | Lyudovyk et al. | |
| 2003/0182105 A1 | 9/2003 | Sall et al. | |
| 2003/0194210 A1 | 10/2003 | Shiiyama | |
| 2004/0143349 A1 | 7/2004 | Roberts et al. | |
| 2004/0148164 A1 | 7/2004 | Baker | |
| 2004/0167767 A1 | 8/2004 | Xiong et al. | |
| 2004/0170392 A1 | 9/2004 | Lu et al. | |
| 2005/0075743 A1 | 4/2005 | Kondo et al. | |
| 2005/0154973 A1 | 7/2005 | Otsuka et al. | |
| 2005/0154987 A1 | 7/2005 | Otsuka et al. | |
| 2005/0169114 A1 | 8/2005 | Ahn | |
| 2005/0198570 A1 | 9/2005 | Otsuka et al. | |
| 2006/0149693 A1 | 7/2006 | Otsuka et al. | |
| 2006/0212297 A1 | 9/2006 | Chaudhari et al. | |
| 2006/0236333 A1 | 10/2006 | Fujikawa et al. | |
| 2006/0266200 A1* | 11/2006 | Goodwin | 84/611 |
| 2007/0230899 A1 | 10/2007 | Shiiyama | |

FOREIGN PATENT DOCUMENTS

| | | |
|---|---|---|
| JP | 8-265660 A | 10/1996 |
| JP | 9-9199 A | 1/1997 |
| JP | 9-284704 A | 10/1997 |
| JP | 10-207455 A | 8/1998 |
| JP | 11-55613 A | 2/1999 |
| JP | 11-266435 A | 9/1999 |
| JP | 2000-99069 A | 4/2000 |
| JP | 3156975 B2 | 2/2001 |
| JP | 2002-344852 A | 11/2002 |
| JP | 2003-099083 | 4/2003 |
| JP | 3475317 B | 9/2003 |
| JP | 2003-298981 A | 10/2003 |
| JP | 2003-309814 A | 10/2003 |
| JP | 2004-120553 A | 4/2004 |
| JP | 2005-284308 A | 10/2005 |
| JP | 2006-301134 A | 11/2006 |
| WO | 03/071537 A1 | 8/2003 |

OTHER PUBLICATIONS

Otsuka et al., "Detection of Music Segment Boundaries using Audio-Visual Features for a Personal Video Recorder" IEEE Transactions on Consumer Electronics, IEEE Service Center, New York, NY, vol. 53, No. 1, Feb. 1, 2007, pp. 150-154. XP011175935.

Otsuka et al, "Detection of Music Segment Boundaries using Audio-Visual Features for a Personal Video Recorder", Consumer Electronics, Jan. 1, 2007, pp. 1 and 2. XP031071464.

* cited by examiner

METHOD AND DEVICE FOR DETECTING MUSIC SEGMENT, AND METHOD AND DEVICE FOR RECORDING DATA

TECHNICAL FIELD

The present invention relates to methods and devices for detecting a music segment from data obtained from a television broadcast and the like. The invention also relates to methods and devices for recording data including that of a music segment detected by the detection methods onto a recording medium including a recordable digital versatile disc such as a DVD-R and a DVD-RW, a hard disk, or a "Blu-ray Disc".

BACKGROUND ART

In one of television broadcasts, there is a genre so called "song program" or "music program". In many cases, music programs consist of pictures of singing or playing instruments by performers or music pictures through video streams (hereinafter, referred to as "music scene" and it is noted that in the present specification the music scene generally denotes pictures including music such as singing and playing instruments in its audio), and consist of pictures other than music, such as introductions of music pieces by the host and others, and talk (conversation) shows by the host with the performers (hereinafter, referred to as "non-music scene").

In commercial broadcasting, programs may include commercial message broadcasts for advertisements from program sponsors or broadcasters themselves (hereinafter, referred to as "CM broadcast").

Meanwhile, when playing back a recorded music program, a viewer who wants to concentrate on the music has a desire to efficiently skip viewing non-music scenes and scenes other than music such as CM broadcasts. On the other hand, a viewer who is not interested in music has a desire to view only non-music scenes such as talk shows by skipping music scenes and CM broadcasts.

For such desires, a conventional method of detecting and recording music identifies music scenes making use of a feature that peaks in the frequency spectrum of sound information are temporally stable in frequency, to store only audio/video of the music scenes (for example, refer to Patent Document 1).

Patent Document 1: Japan Patent Application Publication No. H11-266435 (Page 5 and FIG. 1)

DISCLOSURE OF INVENTION

Problem that the Invention is to Solve

However, in a method of detecting music as disclosed in Patent Document 1, since detection of a music scene is discriminated by such a single technique, it is difficult to ensure equal detection accuracy over the whole variety of music with various tones, such as rock, popular ballad, and classic.

Moreover, in a method of detecting music as disclosed in Patent Document 1, the start and end points of a music scene is difficult to detect with high accuracy, which may sometimes result in detecting a scene, with its start or end portion being lost, among music scenes.

The present invention is made to resolve such problems as described above and to provide a method and a device for efficiently detecting a music scene from data containing a video signal and an audio signal of a television broadcast and the like.

Means for Solving the Problems

A music-segment detection method according to the present invention comprises a data input step of inputting data including an audio signal and a video signal; a plurality of candidate-music-segment detection steps of detecting, from the audio signal, respective candidate music-segments in the input data, based on criteria different from each other; a change-point detection step of detecting a change point in the input data, based on a distinctive change in the audio signal and/or on a distinctive change in a video signal; and a music-segment detection step of detecting a music segment, based on the plurality of detected candidate-music-segments and on the detected change point.

Effect of the Invention

A music-segment detection method according to the present invention detects candidate music-segments from an audio signal, based on a plurality of criteria different from each other, and further detects a music segment from the plurality of detected candidate music-segments using change points in input data. Therefore, the starting and ending scenes of a music scene can be detected with high accuracy, which makes it possible to provide a music scene for a viewer to feel nothing strange.

REFERENCE NUMERALS

Figure 1:
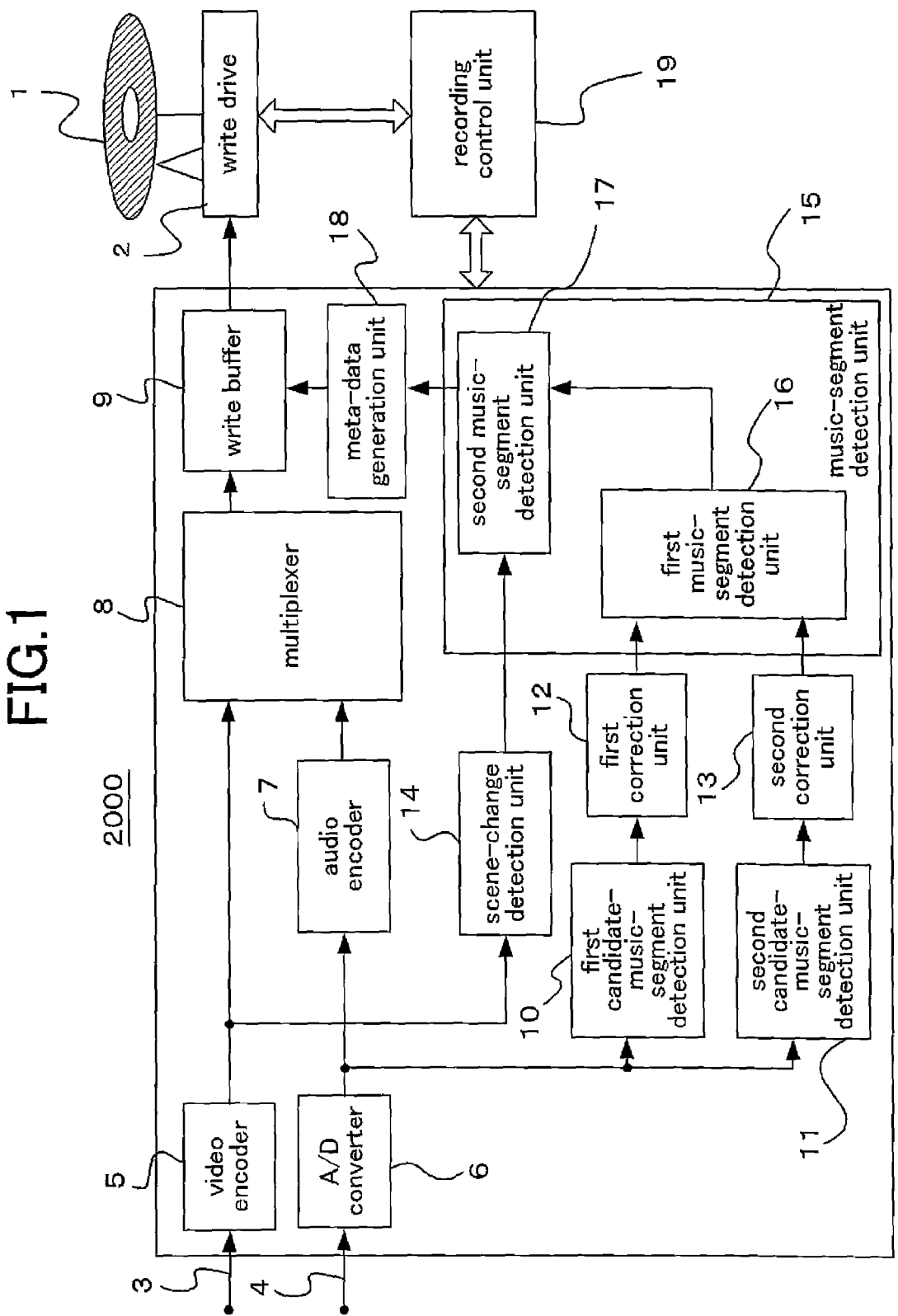
FIG. 1 is a block diagram illustrating a system of an audio/video recording device of Embodiment 1.

1: storage medium; 2: write drive; 3: video signal; 4: audio signal; 5: video encoder; 6: A/D converter; 7: audio encoder; 8: multiplexer; 9: write buffer memory; 10: first candidatemusic-segment detection unit; 11: second candidate-music-segment detection unit; 12: first correction unit; 13: second correction unit; 14: scene-change detection unit; 15: music-segment detection unit; 16: first music-segment detection unit; 17: second music-segment detection unit; 18: meta-data generation unit; 19: recording control unit; 20: orthogonal transform processing section; 21: likelihood-comparison processing section; 22: model data; 23: energy-calculation processing section; 24: change-point determination section; 30: difference-calculation processing section; 40: elapsed time (horizontal axis); 41: difference amount (vertical axis); 42: difference amounts; 43: threshold; 44: label axis; 45: labels; 46*a*, 46*b*, 46*c*: candidate music-segment; 47: correction-processed labels; 48: correction-processed candidate-music-segment; 50: correction-processed labels; 51*a*, 51*b*, 51*c*: correction-processed candidate-music-segment; 52: correction-process labels; 53*a*, 53*b*, 53*c*, 53*d*: correction-processed candidate-music-segment; 54: detection-processed labels; 55*a*, 55*b*, 55*c*, 55*d*: music segment; 60: detection processed labels; 61*a*, 61*b*, 61*c*: first music-segment; 71: video decoder; 72: histogram generator; 73: histogram buffer A; 74: histogram buffer B; 75: difference determination section; 80: audio-level detection unit; 85: labels of scene change; 86: presence or absence of scene change (vertical axis); 87: labels of conversation break point; 88: presence or absence of conversation break point; 90: root directory; 91: multimedia directory; 92: meta-data directory; 93: information management file; 94: multimedia data file; 95: backup file; 96: meta-data file; 100: detection-processed labels; 101*a*, 101*b*, 101*c*: second music-segment; 110: detection-processed labels; 111*a*, 111*b*, 111*c*: second music-segment; 130: meta-data; 131*a*: meta-data management information; 131*b*: program meta-data information search pointer; 131*c*: program meta-data information; 132*a*: general meta-data information; 132*b*: music-map information; 133*a*: general music-map information; 133*b*: music entries; 134*a*: music start-time information; 134*b*: music end-time information; 300: digital signal; 301: demultiplexer; 302: video data; 303: audio data; 310: read/write drive; 400: difference amount graph; 405: label graph; 407: correction-processed label graph; 500: correction-processed label graph; 502: correction-processed label graph; 504: detection-processed label graph; 600: detection-processed label graph; 700: scene-change label graph; 800: conversation-break-point label graph; 1000: detection-processed label graph; 1100: detection-processed label graph.

BEST MODE FOR CARRYING OUT THE INVENTION

Embodiment 1

A description will be made hereinafter on a method and a device for detecting music, and a method and a device for recording the music, according to Embodiment 1 with reference to the drawings. The music detection method of Embodiment 1 features in that candidate music-segments are detected from an audio signal, based on a plurality of criteria different from each other, and a music segment is further detected from the plurality of detected candidate music-segments using change points in input data.

Figure 2:
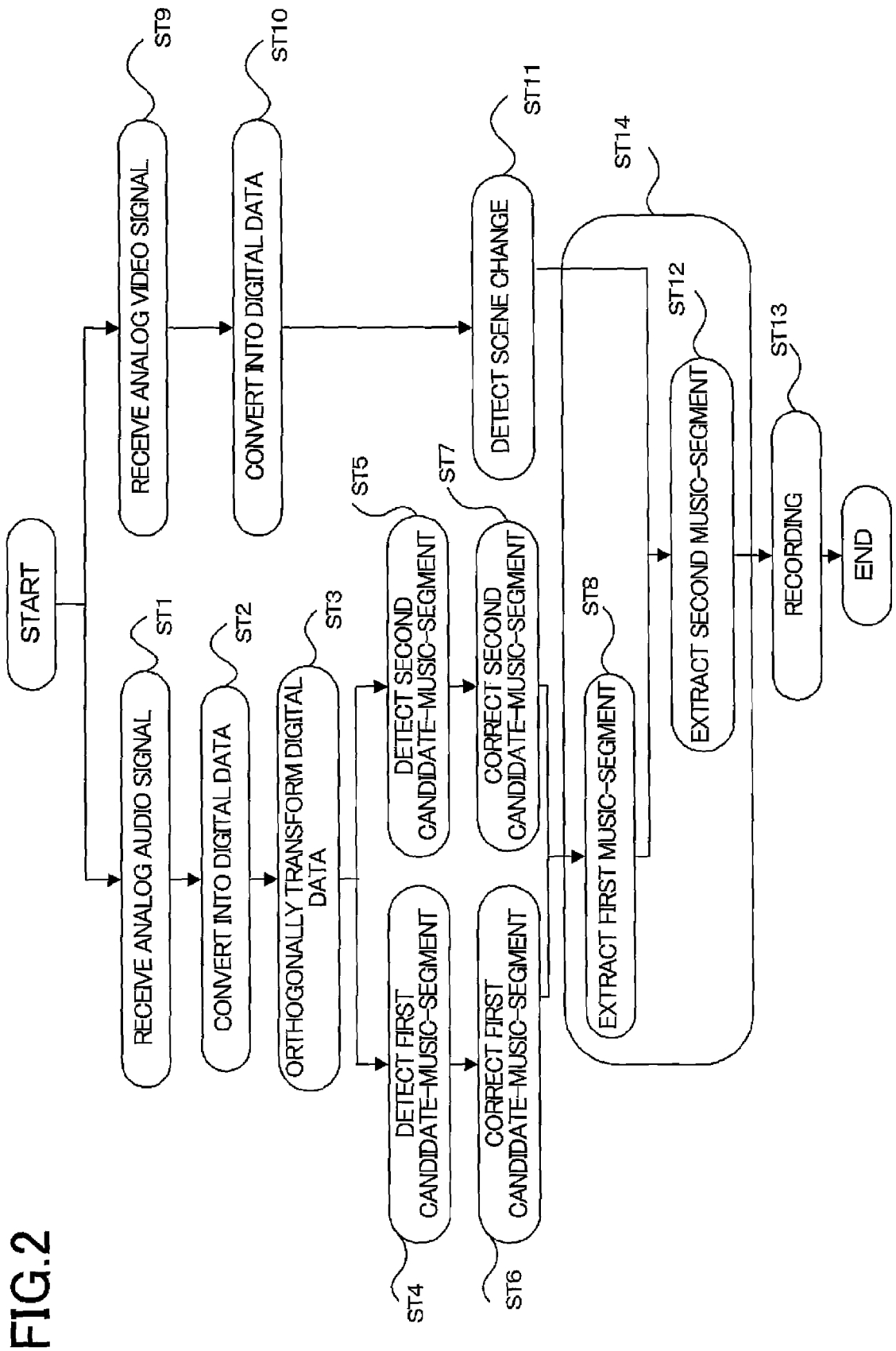
FIG. 2 is a flow chart illustrating a method of detecting and recording a music segment, according to Embodiment 1.

FIG. 1 is a block diagram illustrating a system of an audio/video recording device of Embodiment 1, and FIG. 2 is a flow chart illustrating a method of detecting and recording a music segment according to Embodiment 1. First, the audio/video recording device of Embodiment 1 is outlined with reference to FIGS. 1 and 2. An audio/video recording device 2000 is input with a video signal 3 and an audio signal 4 of a television broadcast and the like to be recorded (ST1 and ST9). Then, the video signal 3 is compression-encoded into video data using an MPEG-2 scheme or the like in a video encoder 5 (ST10).

When the audio signal 4 is an analog signal, it is converted into a digital signal by an analog-to-digital converter 6 (A/D converter) using a pulse code modulation (PCM) technique or the like, in which an audio waveform is sampled at a constant time interval to convert its amplitude into data (ST2). After that, the signal is compression-encoded into audio data in an audio encoder 7 using the Dolby AC-3 algorithm or the like.

A multiplexer 8 multiplexes the video data and the audio data to generate multimedia data. After that, a write buffer memory 9 successively loads the multimedia data and then sends it to a write drive 2, so that the multimedia data is recorded onto a removable storage medium 1 such as a DVD-R disc, a DVD-RW disc, and a recordable "Blu-ray Disc" (the series of processing is also referred to as "video recording"). Operations of the audio/video recording device 2000 and the write drive 2 are systematically managed and controlled by a recording control unit 19 composed of a microprocessor and the like. In addition, the storage medium 1 and the write drive 2 may be replaced with a non-removable storage medium such as a hard disk drive (HDD).

Next, an explanation will be made on a plurality of candidate-music-segment detection units in the audio/video recording device of Embodiment 1. A first candidate-music-segment detection unit 10 analyzes the PCM formatted digital signal output from the A/D converter 6 to detect a candidate music-segment (ST3 and ST4). A first correction unit 12 corrects a detection error as required in the candidate music-segment detected by the first candidate-music detection unit 10 (ST6). Similarly to the first candidate-music-segment detection unit 10, a second candidate-music-segment detection unit 11, which has a criterion different from that of the first candidate-music-segment detection unit 10, also detects a candidate music-segment (ST3 and ST5), and a second correction unit 13 corrects a detection error therein as required (ST7).

A first music detection unit 16 in a music detection unit 15 determines whether the candidate music-segments, each having been detected and corrected by the first candidate-music-segment detection unit 10 and the first correction unit 12 and by the second candidate-music-segment detection unit 11 and the second correction unit 13, are to be integrated, or to be adopted or rejected, to detect a first music-segment (ST8).

Meanwhile, a scene-change detection unit 14 that is a change-point detection unit for video data analyzes the video data output from the video encoder 5 to detect an occurrence of a scene change that is a change in video contents (ST11).

The first music-segment output from the first music-segment detection unit 16 and information on the scene change output from the scene-change detection unit 14 are input into a second music-segment detection unit 17 in the music-segment detection unit 15. The second music-segment detection unit 17 corrects the first music-segment with reference to the information on the scene change, to output a second music-segment (ST12). In Embodiment 1, the second music-segment is a definitive music-segment after the detection processes.

The music segment detected by the second music-segment detection unit 17 is converted into meta-data by a meta-data generation unit 15, to be recorded onto the storage medium 1 via the write buffer memory 9 (ST13). In addition, the meta-data generation unit 15 has a memory function to hold music information on music segments determined by being calculated one after another.

In addition, only the write drive 2 may be included, but also the multiplexer 8, the meta-data generation unit 15, the write buffer memory 9, and the recording control unit 19 may be included in the concept of the recording unit of the audio/video recording device 2000.

While the description has been made here of the case of the two candidate-music-segment detection units 10 and 11 to detect candidate music-segments, an audio/video recording device may be configured with more candidate-music-segment detection units. Moreover, the description has been made of the configuration in which the correction units 12 and 13, after individually correcting respective candidate music-segments having been detected by the candidate-music-segment detection units 10 and 11, output the corrected candidate-music-segments to the music-segment detection unit 15. However, a configuration may be provided such that no individual correction units correct the respective candidate music-segments, but one correction unit corrects them, to output the corrected candidate-music-segments to the music-segment detection unit 15. Furthermore, a configuration may be provided such that a music segment is corrected after having been detected by the music-segment detection unit 15.

Furthermore, while, in the above description, the steps of detecting a first music-segment (ST8) and a second music-segment (ST12) are separately explained for the music-segment detection, both steps can be combined into a single music-segment detection step (ST14).

<First Candidate-Music-Segment Detection Unit>

Figure 3:
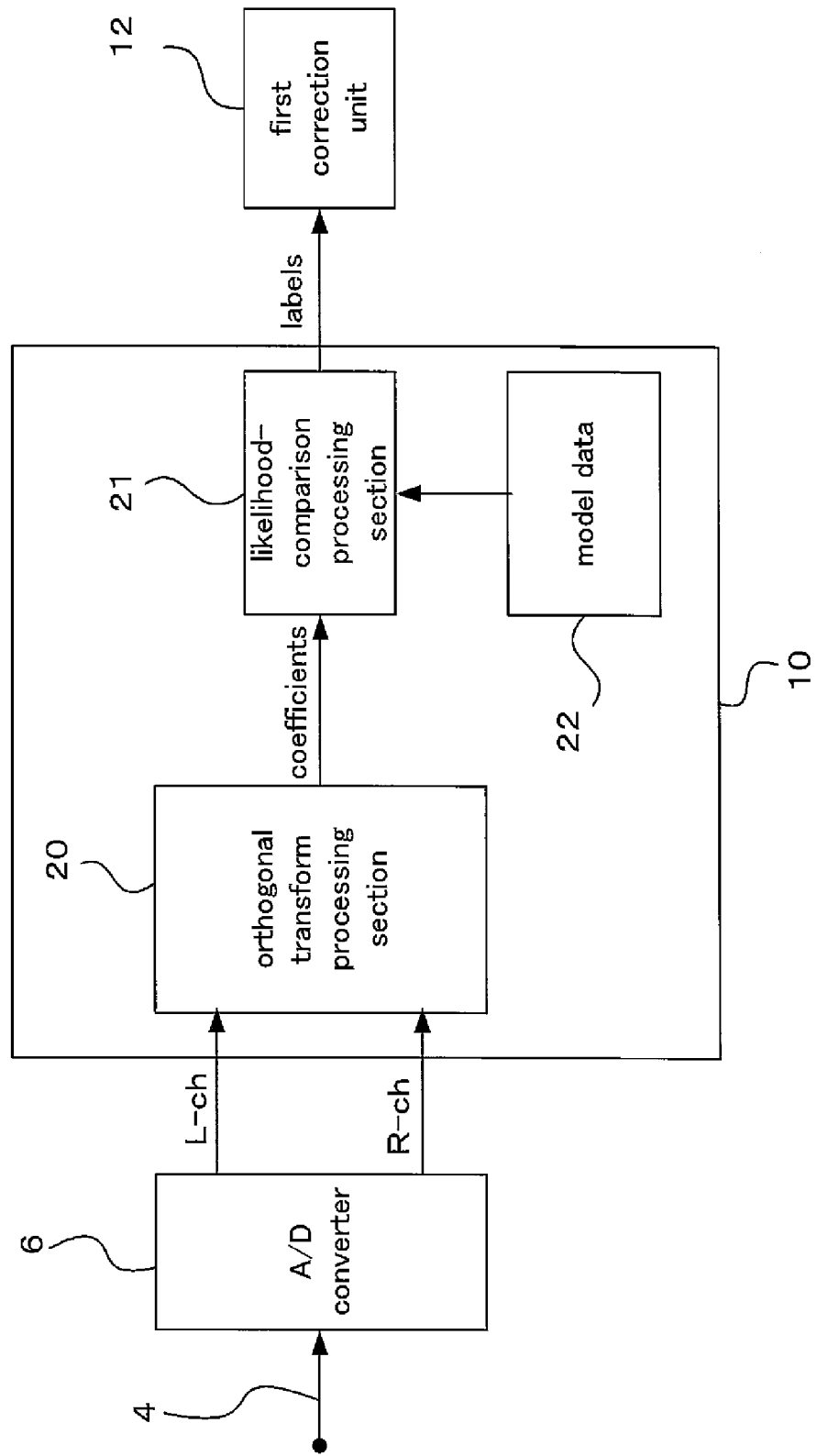
FIG. 3 is a block diagram illustrating a first candidate-music-segment detection unit of Embodiment 1.

FIG. 3 is a block diagram illustrating in detail a function of the first candidate-music-segment detection unit 10 of Embodiment 1. The first candidate-music-segment detection unit 10 is configured with an orthogonal transform processing section 20, a likelihood-comparison processing section 21, and model data 22 that is table data for reference. As shown in the figure, the orthogonal transform processing section 20 calculates orthogonal transform coefficients for the digital signals converted by the A/D converter 6; and then the likelihood-comparison processing section 21 assigns labels by referencing the model data 22, to output the labels to the first correction unit 12.

The detection of a candidate music-segment by the first candidate-music-segment detection unit 10 will be further explained in detail. When the audio signal 4 consists of stereo signals, its PCM data is obtained individually for the right and left channels by the A/D converter 6. Such a quality of a sampling frequency of 48 kHz and a quantization bit count of 16 bits is used for the stereo signals, when they are used in recorders for consumer use.

In the orthogonal transform processing section 20, the PCM data is orthogonally transformed from the time domain to the frequency domain (ST3). An example of using for the orthogonal transformation a modified discrete cosine transformation (MDCT) that overlaps 50% of the PCM data in terms of time, is explained. In order to perform the 50%-overlap, when sampling 512 items of the PCM data, 256 orthogonal transform coefficients (MDCT coefficients) are obtained for the right and left channels each. Coefficient vectors of 256 dimensions are obtained from the orthogonal transform coefficients for one channel (for example, the left channel) of the stereo signals or the single channel of a monaural signal. The number of coefficient vector dimensions may be reduced using a projective transformation for the purpose of reducing computational complexity.

Before analyzing the input audio signals, coefficient vectors of audio that are determined to be an apparent music scene from a subjective evaluation are collected beforehand as training data to model distribution characteristics of the coefficient vectors using a Gaussian mixture model (GMM method). A model generated from music scenes is referred to as "music class model". In addition to this, a plurality of audio class models is prepared using the Gaussian mixture model by similarly collecting training data regarding non-music scenes such as those of prominent rousing and encouraging cheers, applause, and laughing voices by audiences, and talk scenes by performers.

The model data 22 is table data in which these audio class models can be referred. The likelihood-comparison processing section 21 finds by referring to the model data 22 an audio class that has the highest likelihood of the orthogonal transform coefficient vectors in the vector space, of an audio signal being recorded, to assign the audio class as a label to the segment (ST4).

Namely, when an audio segment is input that has high likelihood of the frequency characteristic of a music class model, a label indicating music is assigned, whereby the segment can be detected as a music scene. In addition, likelihood comparison using a Gaussian mixture model may not necessarily be used: a statistical technique such as a hidden Markov model (HMM) may be used as long as the technique identifies an audio class of an input signal by referring to models prepared in advance.

The technique that assigns a label indicating music by likelihood comparison using a Gaussian mixture model has an advantage that only a music scene can be detected with high probability without being influenced by the number of channels of a stereo broadcast, a monaural broadcast, or the like. On the other hand, the technique has a disadvantage that accuracy of detecting a boundary between a music scene and a non-music scene is slightly poor. Depending on a way of collecting training data, an advantage and a disadvantage may also arise from tones of music and compositions of musical instruments, such as rock, popular ballads, and classical music.

<Second Candidate-Music-Segment Detection Unit>

Figure 4:
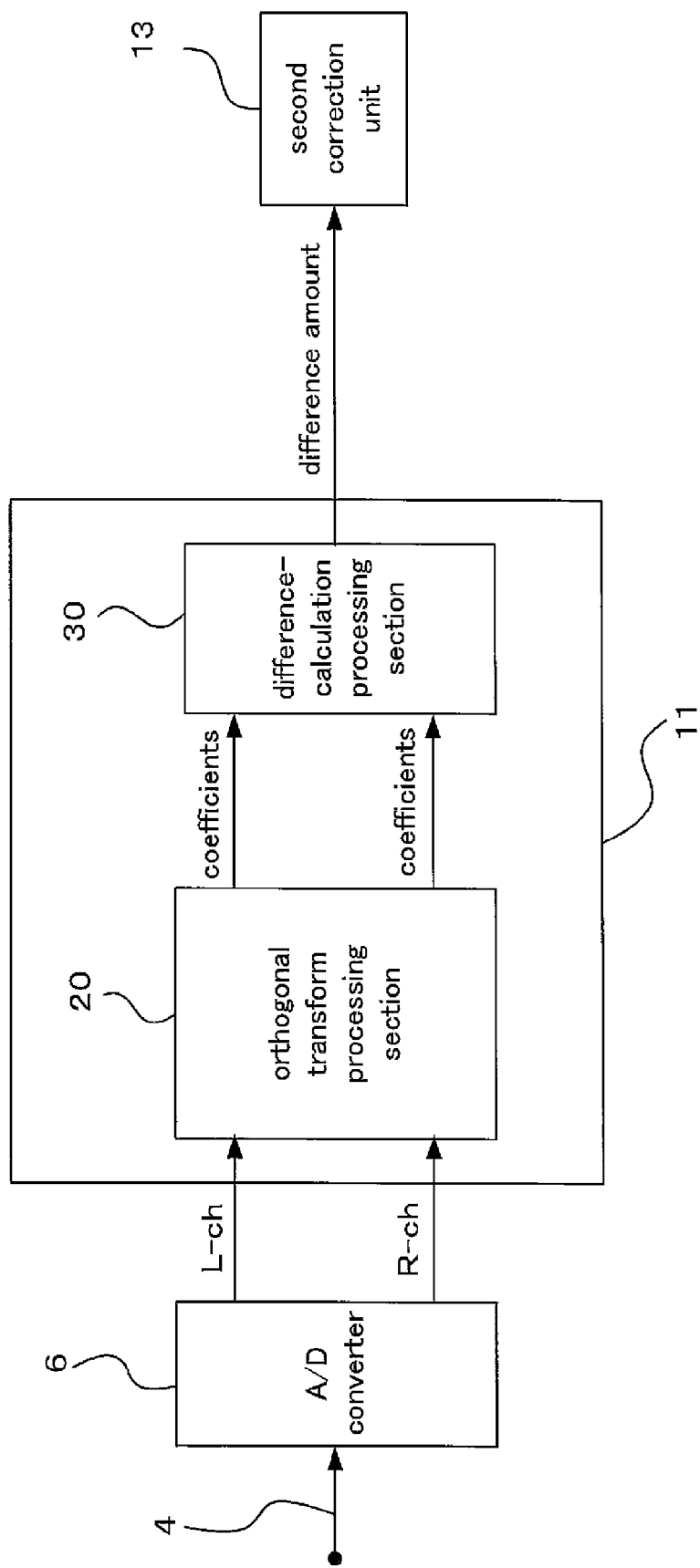
FIG. 4 is a block diagram illustrating a second candidate-music-segment detection unit of Embodiment 1.

Next, the second candidate-music-segment detection unit 11 will be explained. FIG. 4 is a block diagram illustrating in detail a function of the second candidate-music-segment detection unit 11 of Embodiment 1. The second candidate-music-segment detection unit 11 is configured with the orthogonal transform processing section 20 and a difference-calculation processing section 30. As shown in the figure, the orthogonal transform processing section 20 calculates orthogonal transform coefficients for the digital signals converted by the A/D converter 6; and then the difference-calculation processing section 30 calculates the amount of differences between the orthogonal transform coefficients, to output the amount to the second correction unit 13.

The detection of a candidate music-segment by the second candidate-music-segment detection unit 11 is further explained in detail. The processes up to obtaining the 256 orthogonal transform coefficients (MDCT coefficients) from the audio signal 4 through the orthogonal transform processing section 20 (ST3) are common to those described in the explanation of the first candidate-music-segment detection unit 10; hence the explanation of the processes is omitted here.

Defining the orthogonal transform coefficients as a (1×256) matrix, and expressing an orthogonal transform coefficient of the n-th column for the right channel as $Mr(n)$ and that for the left channel as $Ml(n)$, a difference amount D, which is the summation of squared differences between the orthogonal coefficient matrices for both channels, is obtained in the difference-calculation processing section 30 by the following equation:

$$D = \sum_{n=1}^{256} (M_l(n) - M_r(n))^2 \quad \text{Equation 1}$$

By successively executing the process, changes in the difference amount D for a program to be recorded can be grasped (ST5). In addition, while the difference amount D is defined as the summation of squared difference between the orthogonal coefficient matrixes, an equation using another technique may be used as long as it can numerically evaluate the difference between the right and left channels.

The difference amount indicates the difference between the right and left channels and can also be expressed as soundscape feelings, stereo feelings, or the like. It is generally known that music scenes give strong soundscape feelings and non-music scenes such as talk scenes by performers give a little soundscape feelings. That is, a segment that has a difference amount exceeding a predetermined value (threshold) can be detected as a music scene.

Since a difference amount generally varies by large amount at the boundary between a music scene and a non-music scene, the technique that detects the difference amount between orthogonal coefficient matrixes for the right and left channels has an advantage that the start and end times of a music scene can be detected with high accuracy. On the other hand, the method has such disadvantages that a large difference amount happens to be detected even in a non-music scene in a program of a concert, a live venue, or the like, which always gives strong soundscape feelings, and that no difference amounts can be detected in monaural broadcasts. Moreover, an advantage and a disadvantage may also arise from tones of music and compositions of musical instruments such as rock, popular ballads, and classical music.

Figure 5:
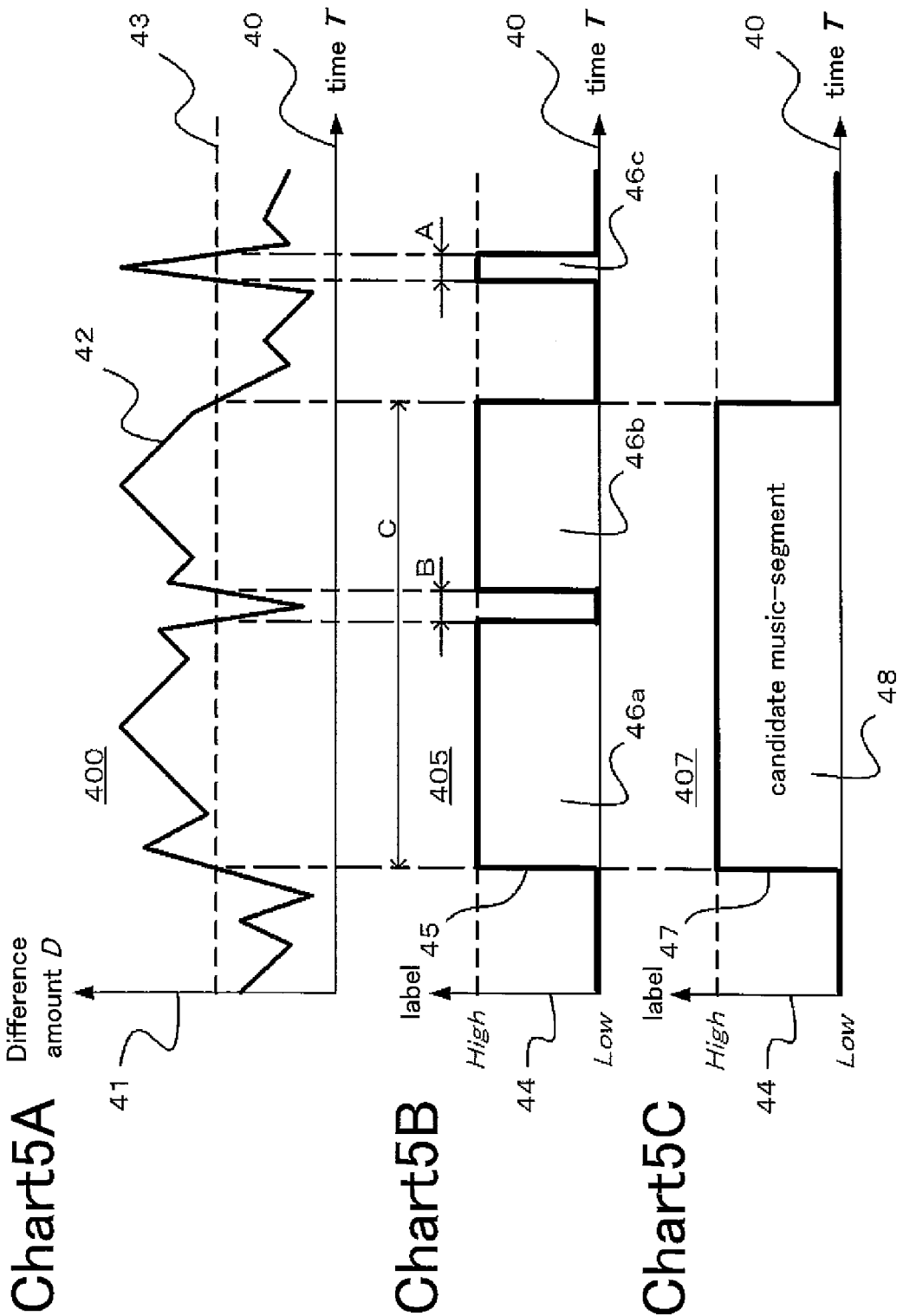
FIG. 5 shows charts illustrating a correction process according to Embodiment 1.

FIG. 5 shows charts illustrating a process of the correction processing (ST6) according to Embodiment 1. Chart 5A in the figure is a graph 400, in which difference amounts 42 are plotted that are calculated by the second candidate-music-segment detection unit 11. The horizontal axis denotes an elapsed time 40 of a recorded program and the vertical axis 41 denotes a difference amount.

In the second correction unit 13, the difference amounts 42 are binarized using a predetermined threshold 43, to assign a label indicating music to a segment whose binarized value exceeds the threshold 43 and a label indicating non-music to a segment whose binarized value falls below the threshold 43. Chart 5B in the figure is a graph 405, in which binary labels 45 are plotted: a segment assigned with a label indicating music and that assigned with a label indicating non-music are expressed by a label axis 44 as "High" and "Low", respectively. Chart 5C in the figure is a graph 407, in which corrected labels 47 are plotted that are obtained by correction-processing the labels 45.

The correction processing by the second correction unit 13, for the difference amounts calculated in the second candidate-music-segment detection unit 11 is explained in detail here with reference to FIG. 5. Binarizing using the threshold 43 the difference amounts 42, which are shown as an example, three candidate music-segments 46a, 46b, and 46c are detected as shown by the labels 45.

Then, the following three correction processes are performed as required for the labels 45 obtained by the binarization:

(a) If a candidate music-segment labeled as music lasts for shorter than a predetermined time T1 (for example, five seconds), its labels are changed to non-music ("Low").

(b) If the time interval between successive candidate-music-segments lasts within a predetermined time T2 (for example, five seconds), the time interval that has been labeled as non-music is changed to be labeled as music ("High").

(c) After performing the above label changes by the processes (a) and (b), a segment labeled as music that lasts for over a predetermined time T3 (for example, sixty seconds) is determined to be a corrected candidate-music-segment. It is noted that either one of the process (a) or the process (b) may be omitted.

Explaining with reference to Chart 5B, the candidate music-segment 46c, because its time interval A is shorter than the predetermined time T1, changes to a non-music segment according to the correction process (a); and the candidate music-segments 46a and 46b, and the segment therebetween having a time interval B, because the interval is shorter than the predetermined time T2, come into one candidate-music-segment according to the correction process (b). As a result, a music segment 48 is obtained according to the correction processes because the time interval C of the candidate music-segment thus obtained lasts for over the predetermined time T3.

A correction processing by the first correction unit 12, of labels calculated in the first candidate-music-segment detection unit 10 is also explained with reference to FIG. 5. Since labels indicating music and non-music are originally calculated in binary in the first candidate-music-segment detection unit 10, plots of the labels become the labels 45 in Chart 5B without being processed. In the labels 45, which are shown as an example, the three candidate music-segments 46a, 46b, and 46c are detected. By performing, similarly to the second correction unit 13, for them the correction processes (a), (b), and (c) as required, the candidate music-segment 48 is obtained.

In this way, by performing the correction processing in each correction unit, it becomes possible to correct such a segment that is erroneously detected at that instant as a music scene in a non-music scene such as a performers' talk show with sound effects, or such a segment that is detected as part of a non-music scene although being a music scene such as a whole rest as rendering during performance.

Moreover, by determining a segment to be a candidate music-segment, in which music is detected for over a predetermined time such as sixty seconds, which are generally equivalent to one chorus of music, it is possible to eliminate a scene inappropriate to be processed as a music scene, such as a short background music scene in talk shows, a catchy part music scene in video clip introduction for advertisement, or an opening or ending theme music scene of a program.

<Process in the First Music-Segment Detection Unit>

Figure 6:
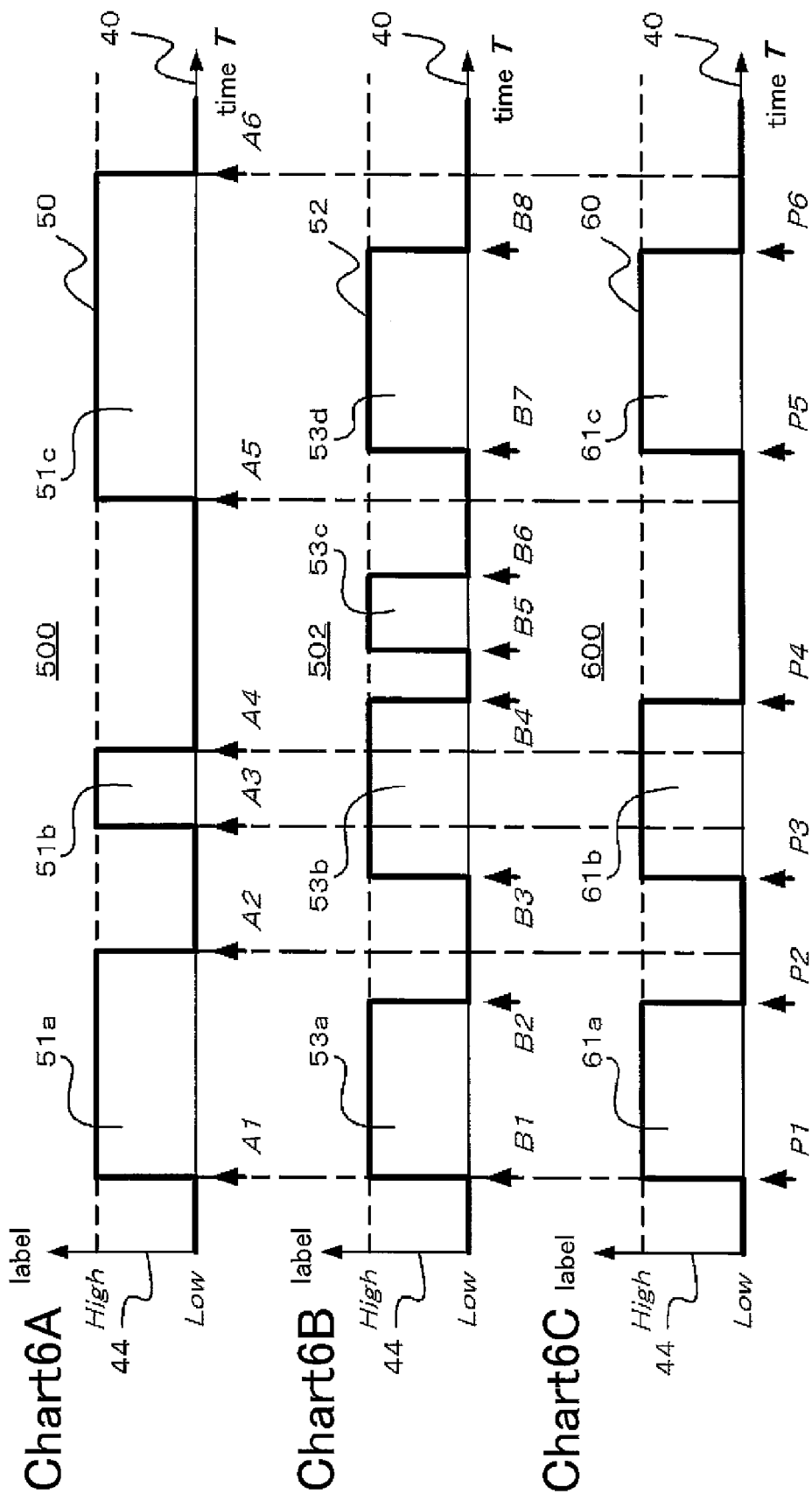
FIG. 6 shows charts illustrating a process of detecting a first music-segment, according to Embodiment 1.

Next, the processing (ST8) in the music-segment detection unit 16 shown in FIG. 1 will be explained. FIG. 6 shows charts illustrating a process of detection processing of first music-segments by the first music-segment detection unit 16 of Embodiment 1. Chart 6A in the figure is a graph 500 in which labels 50 are plotted that have been obtained by the correction-processing by the first correction unit 12, of labels calculated in the first candidate-music-segment detection unit 10. Similarly, Chart 6B in the figure is a graph 502 in which labels 52 are plotted that have been obtained by the correction-processing by the second correction unit 13, of difference amounts calculated in the second candidate-music-segment detection unit 11. Chart 6C in the figure is a graph 600 in which labels 60 are plotted that are detection-processed based on the labels 50 and 52. In all graphs 500, 502, and 600, a segment assigned with a label indicating music and that assigned with a label indicating non-music are expressed by the label axis 44 as "High" and "Low, respectively.

As an example, candidate music-segments 51a, 51b, and 51c shown by the labels 50 and candidate music-segments 53a, 53b, 53c, and 53d shown by the labels 52 are assumed having been detected, as shown in the figure. An explanation is made here on a case of the labels 50 being as a reference.

First, detecting the start time of a candidate music-segment in the labels 52 around the start time A1 of the candidate music-segment 51a, the start time B1 is found. If the start times A1 and B1 are the same time, the detected start time of a music segment 61a is determined to be the start time P1. Next, detecting the end time of the candidate music-segment in the labels 52 around the end time A2 of the candidate music-segment 51a, the end time B2 is detected, so that the detected end time of the music segment 61a is determined to be the end time P2 by adopting the end time B2.

Further detecting the start time of a candidate music-segment in the labels 52 around the start time A3 of the candidate music-segment 51b, the start time B3 is detected, so that the detected start time of a music segment 61b is determined to be the start time P3 by adopting the start time B3. Similarly, as for the end time A4, the end time B4 is detected, so that the detected end time of the music segment 61b is determined to be the end time P4 by adopting the end time B4.

At that time, a range of detecting the start time of the candidate music-segment in the labels 52 is limited from the time A2 to the time A4 with respect to the time A3, and a range of detecting the end time of the candidate music-segment in the labels 52 is limited from the time A3 to the time A5 with respect to the time A4. In that case, if there are no candidate music-segments in the labels 52, a candidate music-segment in the labels 50 is determined as a detected music segment.

Similarly, the start time P5 and the end time P6 of a music segment 61c are also determined by the detection processing. As for the candidate music-segment 53c in the labels 52, it is eliminated by the detection processing because there are no corresponding candidate-music-segments in the labels 50 that are the reference.

In this way, in FIG. 6, used as a reference is a candidate music-segment detected by the first candidate-music-segment detection unit 10 having the detection characteristic that a music scene i.e., an intermediary portion in a music segment can be detected with high probability, but the boundary between a music scene and a non-music scene is detected with slightly poor accuracy. Then, detected is the presence or absence of a candidate music-segment detected by the second candidate-music-segment detection unit 11 having the detection characteristic that the start and end times of a music segment can be detected with high accuracy on the one hand but a non-music segment is likely to be detected on the other hand.

In other words, taking into account both detection characteristics, the detection processing of the start and the end times of a music segment is performed by preferentially adopting the start and end times of the candidate music-segment detected by the second candidate-music-segment detection unit 11. The start and end times of a music segment can thereby be detected with high accuracy as well as erroneous detection of a non-music scene can be reduced.

Namely, taking into account both detection characteristics being in a relation complementary to each other, a music segment can be detected with high accuracy by detecting the start and end times of a music segment based on a music scene that is an intermediary portion in the music segment.

In Embodiment 1, the method is described that detects a first music-segment using as a reference a candidate music-segment detected by one of the candidate-music-segment detection units with reference to that detected by the other candidate-music-segment detection unit, as shown in FIG. 6. A method other than this may be employed that detects a plurality of candidate music-segments using logical OR (logical sum). In this case, since all candidate music-segments detected by a plurality of music-segment detection means with detection criteria different from each other are determined to be first music-segments, music of a wide variety of genres can be detected depend on music detection means employed. Moreover, since the detected candidate-music-segments are included in the first music-segments, none of the music scenes are subject to be eliminated, <Scene-Change Detection Unit>

As described above, a first music-segment is detected based upon only audio data information. In order to enable detection of a music segment, taking video data information into account, the audio/video recording device 2000 of Embodiment 1 is hence provided with the scene-change detection unit 14 that is a detection unit for detecting a change point in a video signal, to thereby be able to cope with a music scene whose start or end point is set an intermediary in a first music-segment having continuity as a video scene. A description will be made below of a method of correcting the start point or the end point of a first music-segment when the music-segment is detected from video data.

Figure 7:
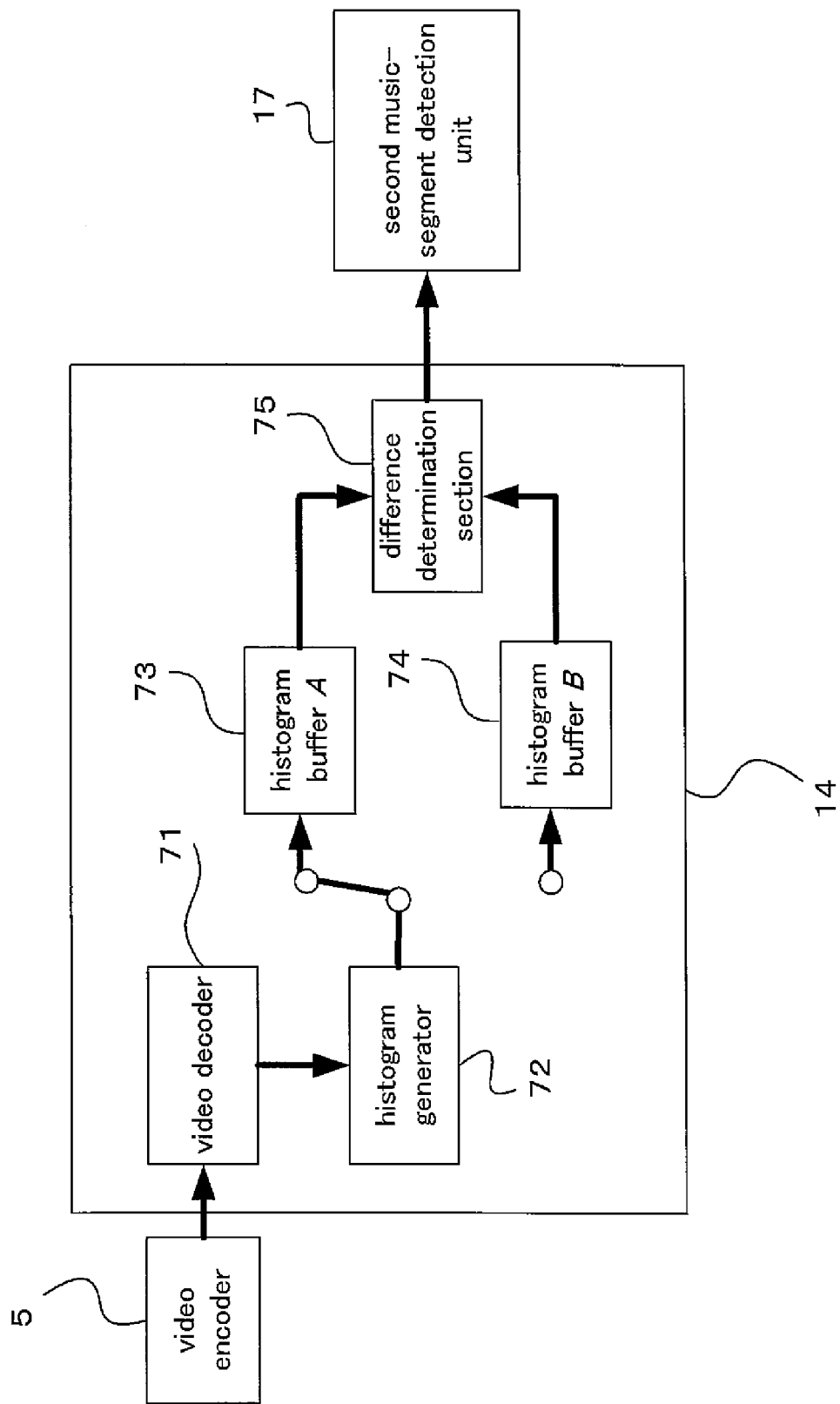
FIG. 7 is a block diagram illustrating a scene-change detection unit of Embodiment 1.

FIG. 7 is a block diagram illustrating in detail a function of the scene-change detection unit 14 of Embodiment 1. The scene-change detection unit 14 is configured with a video decoder 71, a histogram generator 72, a histogram buffer A 73, a histogram buffer B 74, and a difference determination section 75.

As shown in the figure, the video decoder 71 decodes on a frame basis a video stream having been encoded into, for example, an MPEG-2 programmed stream by the video encoder 5, to generate video data in which pixels each are expressed by 256 tones for each of Y, U and V components. For the pixel video data expressed by 256 tones for each of Y, U and V components, the histogram generator 72, defining as a class each of the 256 tones of the Y, U and V components, generates a histogram distribution (hereinafter, referred to as "histogram data") in which the number of pixels belonging to a class of each Y, U and V component is expressed as a histogram for a frame.

The histogram buffers A 73 and histogram buffer B 74, each have a function of holding the histogram data generated by the histogram generator 72, is buffers for providing, as required, the histogram data for the difference determination section 75 that will be described later. The reason that the scene-change detection unit 14 has thus two buffers is to detect the difference in video data between two frames.

The difference determination section 75 compares the two sets of histogram data held in the histogram buffer A 73 and the histogram buffer B 74, to determine that a scene change has occurred if the difference is larger than a predetermined value. A method of determining a scene change is described specifically below. First, the absolute difference between histogram values Ha(y, u, v) and Hb(y, u, v) in the histogram buffer A 73 and the histogram buffer B 74, respectively, is calculated for each Y, U and V component on an identical tone basis, and then the calculated differences are summed up for all class values. Defining the summation value as a difference value between two frames, when the difference value is equal to or larger than a predetermined threshold, determination is made that a scene change has occurred. When an occurrence of a scene change is detected, time information on the scene change is output to the second music-segment detection unit 17.

<Processing of Scene-Change Detection Unit>

Next, a method of detecting a scene change between frame data Pi and frame data Pj to be displayed subsequent to the frame data Pi is explained more specifically. For simplicity of the explanation, it is assumed here, for example, that the order of frames decoded by the MPEG-2 has been sorted in a displaying order at the time when the frames are outputted from the video decoder 71.

The 256-tone-expressed video-data for Y, U and V components output from the video decoder 71 is input into the histogram generator 72. In the histogram generator 72, a histogram for each Y, U and V component expressed with 256 tones is expressed by the following format.

$$H[256][256][256]. \qquad \text{Equation 2}$$

Furthermore, histograms of the frame data Pi and frame data Pj each are expressed by the following formats.

$$Hi(y,u,v) \qquad \text{Equation 3}$$

$$Hj(y,u,v) \qquad \text{Equation 4}$$

After the preceding frame data Pi is output from the video decoder 71, a histogram Hi(y, u, v) is generated by the histogram generator 72 and stored into the histogram buffer A 73. Then, when the frame data Pj subsequent to the frame data Pi is decoded in the video decoder 71, a histogram Hj(y, u, v) is generated and stored into the histogram buffer B 74 this time. After the two histograms Hi(y, u, v) and Hj(y, u, v) are stored into the histogram buffer A 73 and the histogram buffer B 74, respectively, the difference determination section 75 calculates a difference value Dv shown below.

$$Dv = \frac{1}{2} \sum_{y,u,v}^{256} |Hi(y, u, v) - Hj(y, u, v)| \qquad \text{Equation 5}$$

The difference value Dv takes on values from 0 to 1 at the maximum, and it is considered that degree of change in image between two frames is larger as the value becomes larger. For example, if the image of frame data Pi is completely the same as that of frame data Pj, the value Dv becomes zero. In contrast, if two images are completely different from each other, for example, the image of frame data Pi is perfect white and that of frame data Pj is perfect black, the value Dv becomes one. For example, setting the threshold to 0.8, when the value Dv exceeds the threshold of 0.8, determination is made that a scene change occurs. When the difference determination section 75 determines that a scene change occurs between the frame data Pi and the frame data Pj, the determination section regards that the scene change occurs in the frame data Pj of the subsequent frame, and outputs time information such as the presentation time of the frame data Pj or its frame number into the second music-segment detection unit 17.

By performing the above operation continuously on frame data output from the video encoder 5, it is possible to detect scene changes in video data.

<Second Music-Segment Detection Unit>

Figure 8:
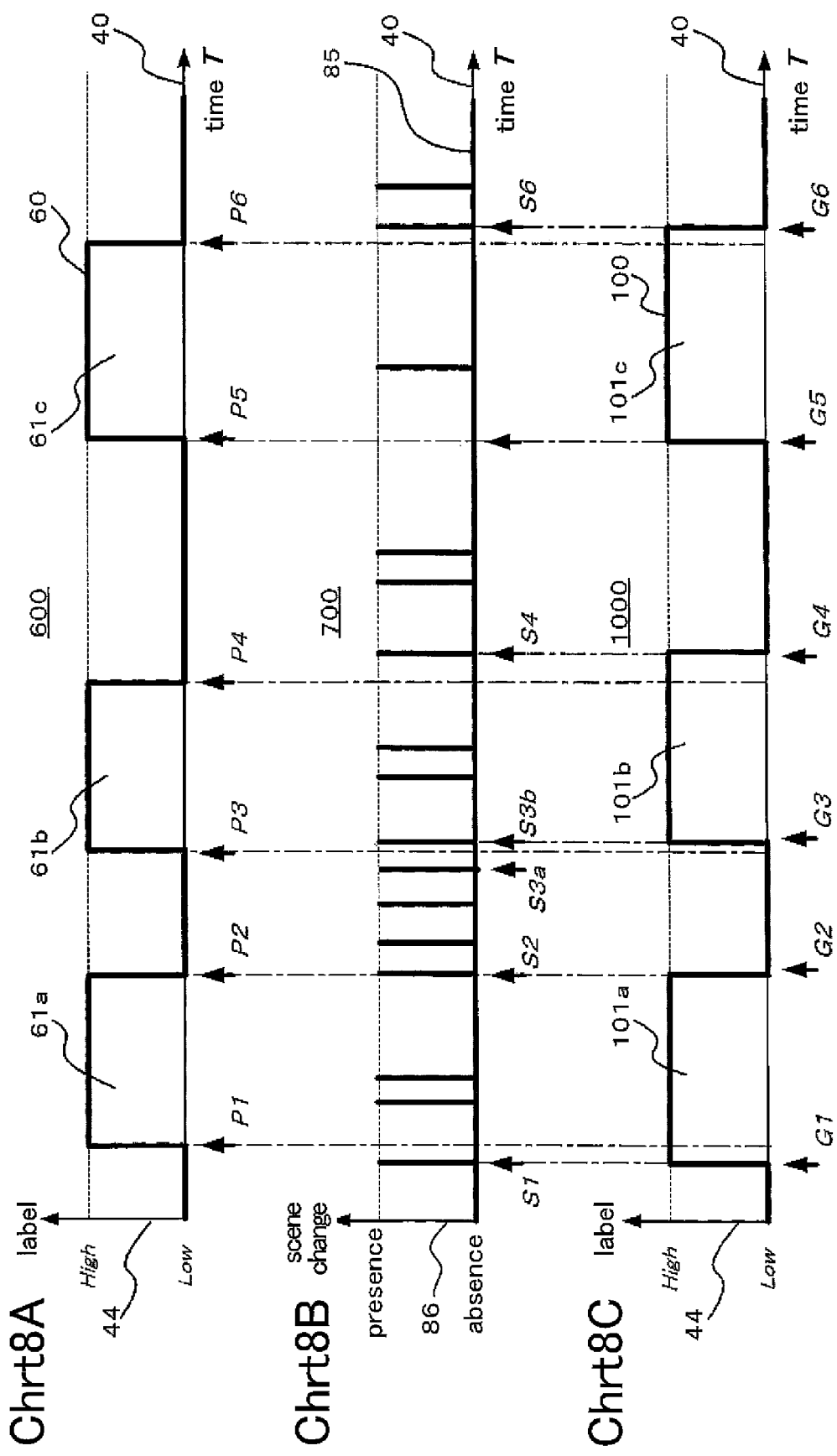
FIG. 8 shows charts illustrating a process of detecting a second music-segment, according to Embodiment 1.

FIG. 8 shows charts for explaining a process in the second music-segment detection unit 17 of Embodiment 1: the figure shows the processes of correcting, using scene change information obtained by the scene-change detection unit 14, the start and end points of a first music-segment detected by the first music-segment detection unit 16 (ST12). Chart 8A in the figure is a graph 600 in which labels 60 are plotted that indicate first music-segments detected by the first music-segment detection unit 16. Chart 8B in the figure is a graph 700 in which the time positions of scene changes detected by the scene-change detection unit 14 are plotted as labels 85, and the horizontal axis denotes elapsed time 40 of a recorded program and the vertical axis 86 denotes the presence or absence of a scene change. Chart 8C in the figure is a graph 1000 that represents second music-segments, in which labels 100 are plotted that are obtained by correcting, using the labels 85 representing the time positions of the scene changes, the labels 60 representing the first music-segments. In both graphs 600 and 1000, a segment assigned with a label indicating music and that assigned with a label indicating non-music are expressed by the label axis 44 as "High" and "Low", respectively.

The detection process of a second music-segment by the second music-segment detection unit 17 using scene change information is explained with reference to FIG. 8. In general, a scene change often occurs at a change point (break point) between a music segment and a non-music segment that are scenes independent of each other. Hence, by correcting the start and end points of a detected first music-segment to the times when scene changes occur, the start and end points of the music segment can be extracted with extreme accuracy.

An explanation is made on a case as an example in which first music-segments 61a, 61b, and 61c have been detected from the labels 60. The second music-segment detection unit 17 determines the start and end points of the music segments using the times of scene changes that occur around the start points or the end points P1, P2, P3, P4, P5, and P6 of the music segments. It is noted that "around" here referred to denotes a predetermined time interval before and after from a reference time.

A detailed explanation is made below with reference to FIG. 8. Detecting a scene change point in the time interval before and after the start time P1 of the music segment 61a (for example, two seconds before and after), a scene change is found at a time S1 before the time P1 (leftward on the time axis). The time S1 is then adopted as the start time G1 of a corrected music-segment 101a. Similarly, detecting a scene change in the time interval before and after the end time P2 of the music segment 61a, a scene change is found at a time S2 that is the same time as the time P2. The time S2 (=P2) is then adopted as the end time G2 of the corrected music-segment 101a.

Further detecting a scene change in the time interval before and after the start time P3 of the music segment 61b, two scene changes are found at the times S3a and S3b. Then, the time S3b that is closer to the time P3 is adopted as the start time G3 of the corrected music-segment 101b. Detecting similarly a scene change in the time interval before and after the end time P4 of the music segment 61b, no scene changes are found within the interval two seconds before and after the end time. In this case, a scene change is further detected along a direction in which the music segment extends, i.e., detected in a time interval (for example, ten seconds) after the end time P4. A scene change is then found at the time S4, and accordingly, the time S4 is adopted as the end time G4 of the corrected music-segment 101b.

Further detecting a scene change in the time interval before and after the start time P5 of the music segment 61c, no scene changes are found in the interval. Then, further detecting a scene change along a direction in which the music segment extends, i.e., detected in a time interval (for example, ten seconds) before the start time P5, no scene changes are found either. In this case, the time P5 is adopted as the end time G5 of a detected music-segment 101c. Similarly for the end time P6 of the music segment 62c, the occurrence time S6 of a scene change in the time interval before and after the end time is adopted as the end time G6 of the corrected music-segment 101c.

By the method explaining above, a second music-segment that is a definitive music-segment is determined. Since scene change points are thereby determined to be the start point and the end point of a second music-segment, the start and end points of a music segment can be accurately extracted, so that a series of music scenes can also be detected, with scene break points for a viewer to feel nothing strange being as start points or end points of the scenes.

Figure 9:
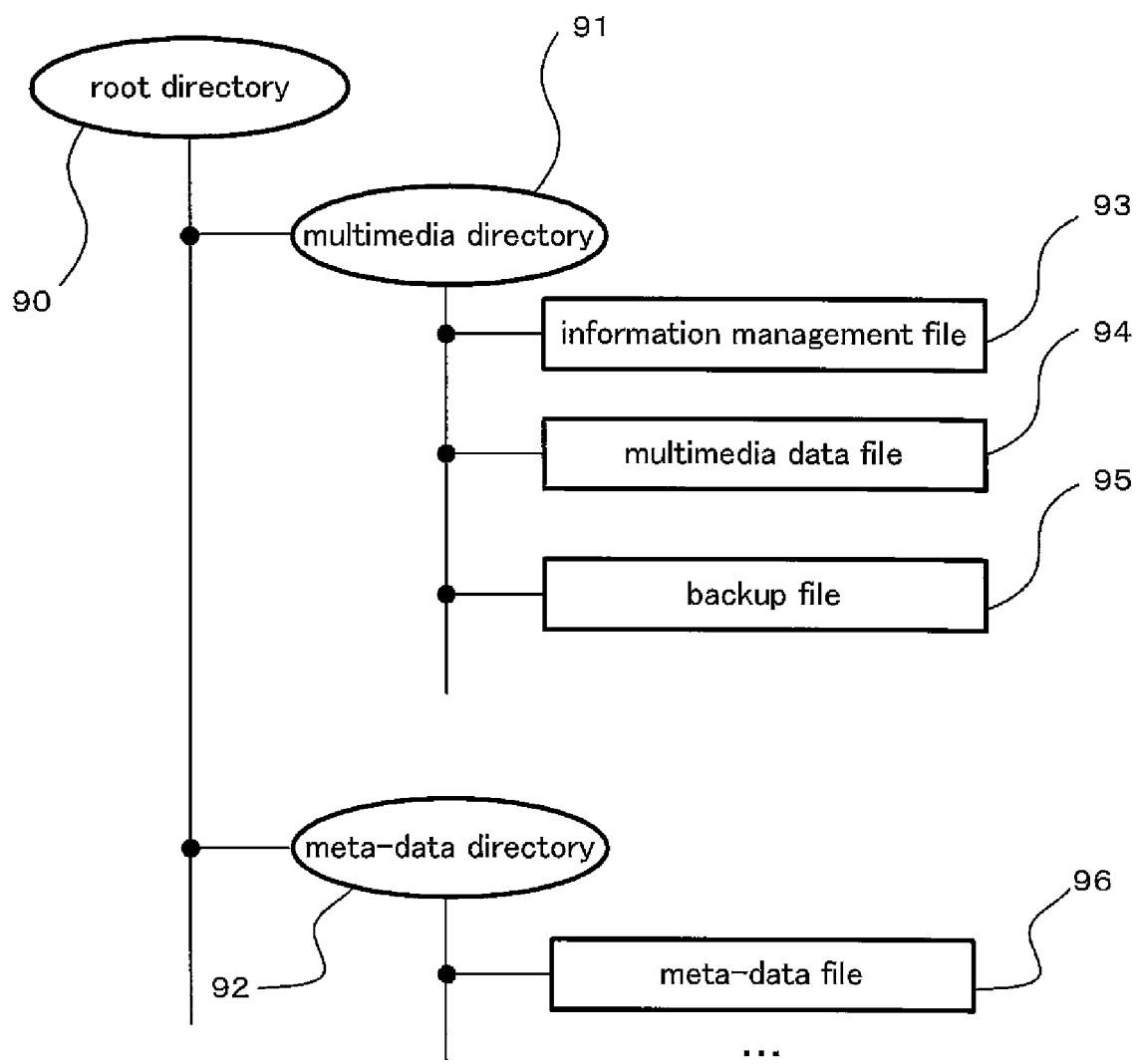
FIG. 9 is a file structure diagram in the audio/video recording device of Embodiment 1.

Next, a method of creating, by a meta-data generation unit 15, meta-data files from music information on a detected music-segment will be explained with reference to FIGS. 9 and 10. FIG. 9 is a file structure diagram in the audio/video recording device of Embodiment 1. In other words, FIG. 9 illustrates a logical file structure of the storage medium 1: a root directory 90 is located at the top of the directory structure of the logical hierarchy, and a multimedia directory 91 and a meta-data directory 92 are located under the root directory 90.

In the multimedia directory 91, located are an information management file 93 in which management information including management numbers of programs recorded in the storage medium 1 is written, a multimedia data file 94 in which video signals or audio signals of programs are compression-encoded and multiplexed, and also a backup file 95 for the information management file 93 and the like.

In the meta-data directory 92, on the other hand, a meta-data file 96 that is a separate logical file is located. Music information on a music segment detected when a program is recorded and the multimedia data file 94 is created, is written into the meta-data file.

While FIG. 9 shows an example of the multimedia data file 94 and the meta-data file 96 both being located in the individual directories, the files may be located in the same directory or the meta-data file 96 may be located immediately below the root directory 90. Moreover, the multimedia data file 94 or the meta-data file 96 may be divided into a plurality of files according to the number of recorded programs or depending on the limitation of file size and the like.

Furthermore, the meta-data file 96 in Embodiment 1 may be in text format or binary format irrespective of their data format. Furthermore, the meta-data file 96 may be subject to a cryptographic processing in order to prevent falsification of data and leakage of information written therein.

Furthermore, information such as whether or not exists a meta-data file 96 corresponding to a desired program, or whether or not valid values exist in the meta-data file 96, may be written in the information management file 93. With such information recorded in the information management file 93, existence or validity of music information is quickly determined by referring to the information when playing back the program.

The meta-data file 96 is thus defined to be a separate logical file without meta-data therein being superimposed on nor multiplexed with the multimedia data file 94. Thereby, in playing back a program, music information can be quickly acquired by reading the relatively small meta-data file 96 without scanning the large multimedia data file 94.

In addition, the meta-data in the meta-data file 96 may be superimposed in the multimedia data file 94. In this case, the number of the files can be reduced, and since the meta-data is included in the same file as that in which the multimedia data is written, the meta-data can be prevented from scattering, when the multimedia data including music information is recorded on a removable recording medium to perform a file operation such as editing or copying by another device.

Figure 10:
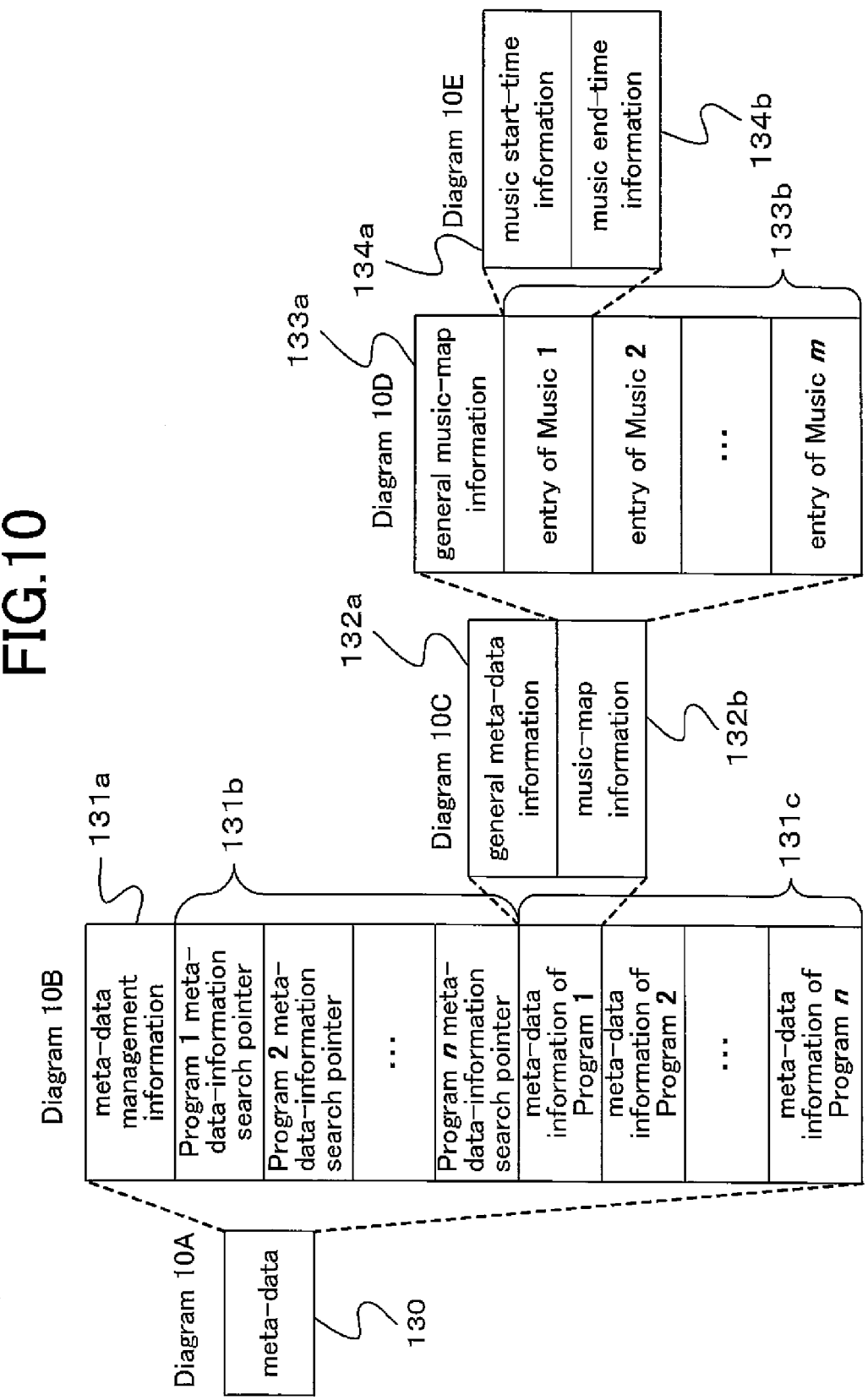
FIG. 10 is a meta-data structure diagram according to Embodiment 1.

FIG. 10 is a meta-data structure diagram having a hierarchical structure according to Embodiment 1. Diagram 10A in the figure indicates meta-data 130 at the top of the hierarchical data structure.

Next, the data structure of the meta-data 130 is explained with reference to Diagram 10B in FIG. 10. Information on the whole meta-data is systematically written in meta-data management information 131a. In this hierarchical level, there located are items of program meta-data information 131c in proportion to the number of programs (one to n) having music information, and program H meta-data information search pointers 131b that are items of address information for individually accessing the items of the program meta-data information 131c.

If no programs having music information exist in the storage medium 1, the meta-data file 96 may not be created or may be prepared in which the number of the items of the program meta-data information 131c is written as zero in the meta-data management information 131a.

Next, the data structure of the program meta-data information 131c is explained with reference to Diagram 10C in FIG. 10. In this hierarchical level, there located are general meta-data information 132a and music-map information 132b. In the general meta-data information 132a, there written are the management number of a program to which the program meta-data information 131c corresponds as well as address information for accessing the music-map information 132b and the like. The general meta-data information 132a is a data table for linking a program to the meta-data when the management number of a program managed with the information management file 93 does not coincide with the number of the items of the program meta-data information 131c, since music information may not be generated depending on a program, such as when a program other than a music program is recorded.

Next, the data structure of the music-map information 132b is explained with reference to Diagram 10D in FIG. 10. In this hierarchical level, there located are general music-map information 133a and music entries 133b the number of which is equivalent to the number (one to m) of detected music-segments. In the general music-map information 133a, address information for individually accessing the music entries 133b are written.

Lastly, the data structure of the music entries 133b is explained with reference to Diagram 10E in FIG. 10. In this hierarchical level, there located are sets of music start-time information 134a and music end-time information 134b on a detected music-segment. For the time information, a presentation time (PTM) or the like is used.

While the description has been made here of the case in which information on a second music-segment is stored as meta-data, storage of information on a music-segment is not limited to this. For example, information on a first music-segment obtained by the first music-segment detection unit 16 and scene change information obtained by the scene-change detection unit 14 may be stored as meta-data, to perform at play back the detection processing of a second music-segment in the second music-segment detection unit 17.

While an example of how to write the start and end times of a music segment in meta-data has been described above in Embodiment 1, the meta-data only needs to have such a data structure that music information can be specified from a recorded program. For example, segments are binarized in such a way that a music scene segment is labeled as "High" (one) and a non-music scene segment is labeled as "Low" (zero) when a program is discretized at a fixed time interval such as one second, and a data structure is formed in which the binarized result is enumerated as music-map information; whereby a function equivalent to that of the data structure mentioned above can also realized.

In playing back a program recorded in the storage medium 1, music information on music in the program thereby can be grasped by reading out the meta-data 130 from the meta-data file 96. Accordingly, the playback control based on music information allows efficiently viewing music scenes with use of such functions as successively playing back music segments only and skipping to the start or end point of a music segment by manual operation.

In other words, in order to skip viewing non-music scenes and CM broadcasts, it has previously been necessary to find boundaries such as the top or end of a music scene by manual operation of fast-forward or fast-backward playback.

Moreover, when a viewer wants to view music scenes or non-music scenes in a long program recorded in a recording medium, the viewer is forced to find a desired scene while viewing fast-forward (forward scanned) or fast-backward (backward scanned) pictures, or to repeat the operation of skipping a fixed time such as fifteen seconds until the desired scene appears. For that reason, it is extremely difficult to play back a music scene without accidentally passing over the start or end point thereof unless the point of the music is accurately grasped in advance. In particular, when playing back a program not having been viewed, because of not knowing where a music scene is in the program, it necessarily takes time and effort to find the music scene from the beginning of the program.

Playback of a program recorded according to Embodiment 1, in contrast, eliminates the operations as described above. That is, it is possible to take such playback control as successively playing back music segments only and skipping to the start or end point of a music segment by manual operation because the music segments can be grasped in advance even when playing back the program not having been viewed.

While Embodiment 1 has been explained by way of example of using a television broadcast for the video signal 3 and the audio signal 4, these signals may also be, for example, an audio/video signal fed from the external input terminal using another video playback apparatus. Otherwise, music information may be detected from a PCM signal obtained by decoding compression-encoded audio data read from audio/video data recorded in a hard disk (not shown) built into a video recorder, in the removable storage medium 1, or the like. Since this manner eliminates the need to perform the detection processing of a music segment in real time during recording, it is possible to take time to perform the detection after recording even though a recording control unit has a low processing capability. Moreover, music information can also be obtained from a program having already been recorded in a storage medium.

Embodiment 2

Figure 11:
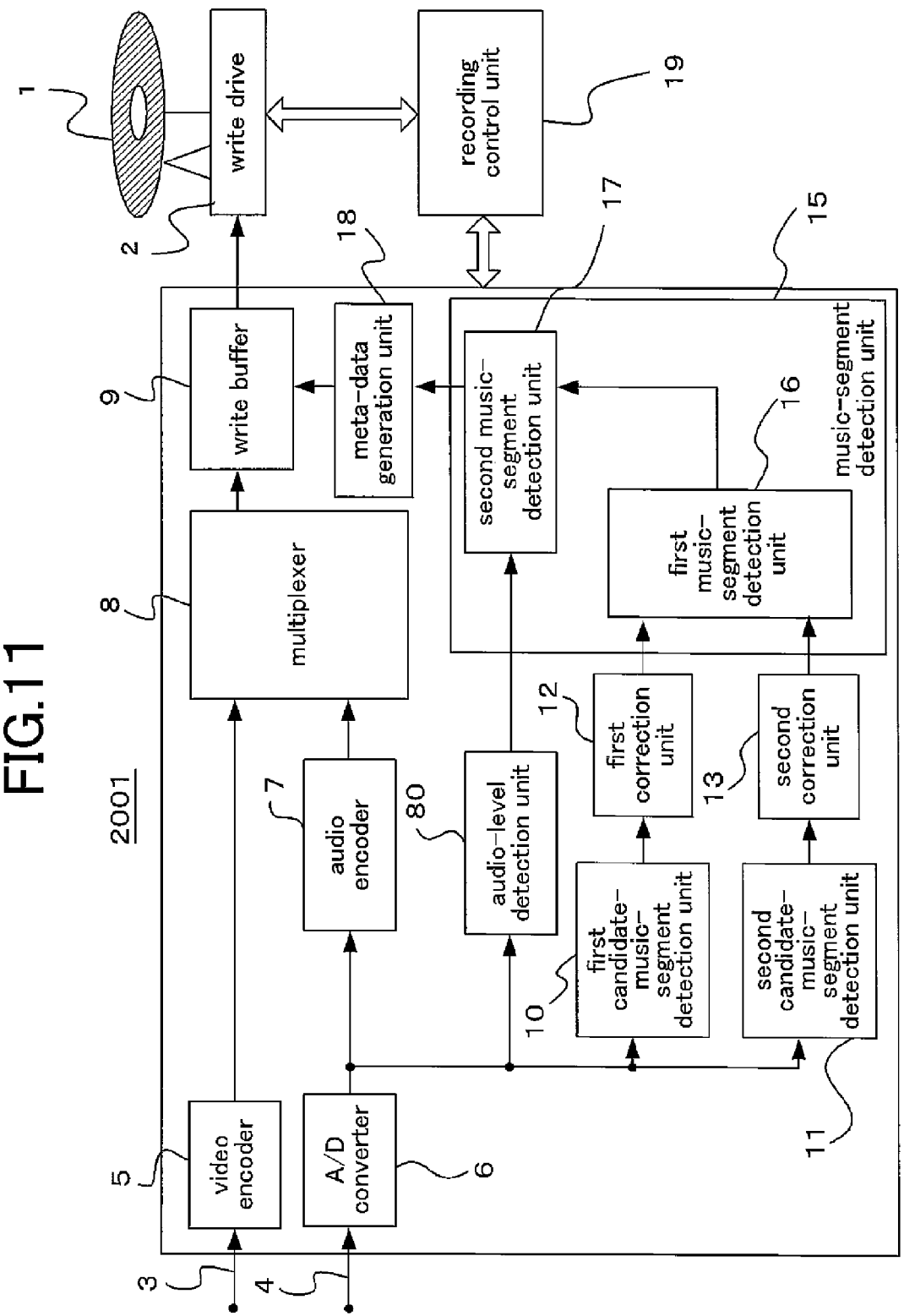
FIG. 11 a block diagram illustrating a system of an audio/video recording device of Embodiment 2.
Figure 12:
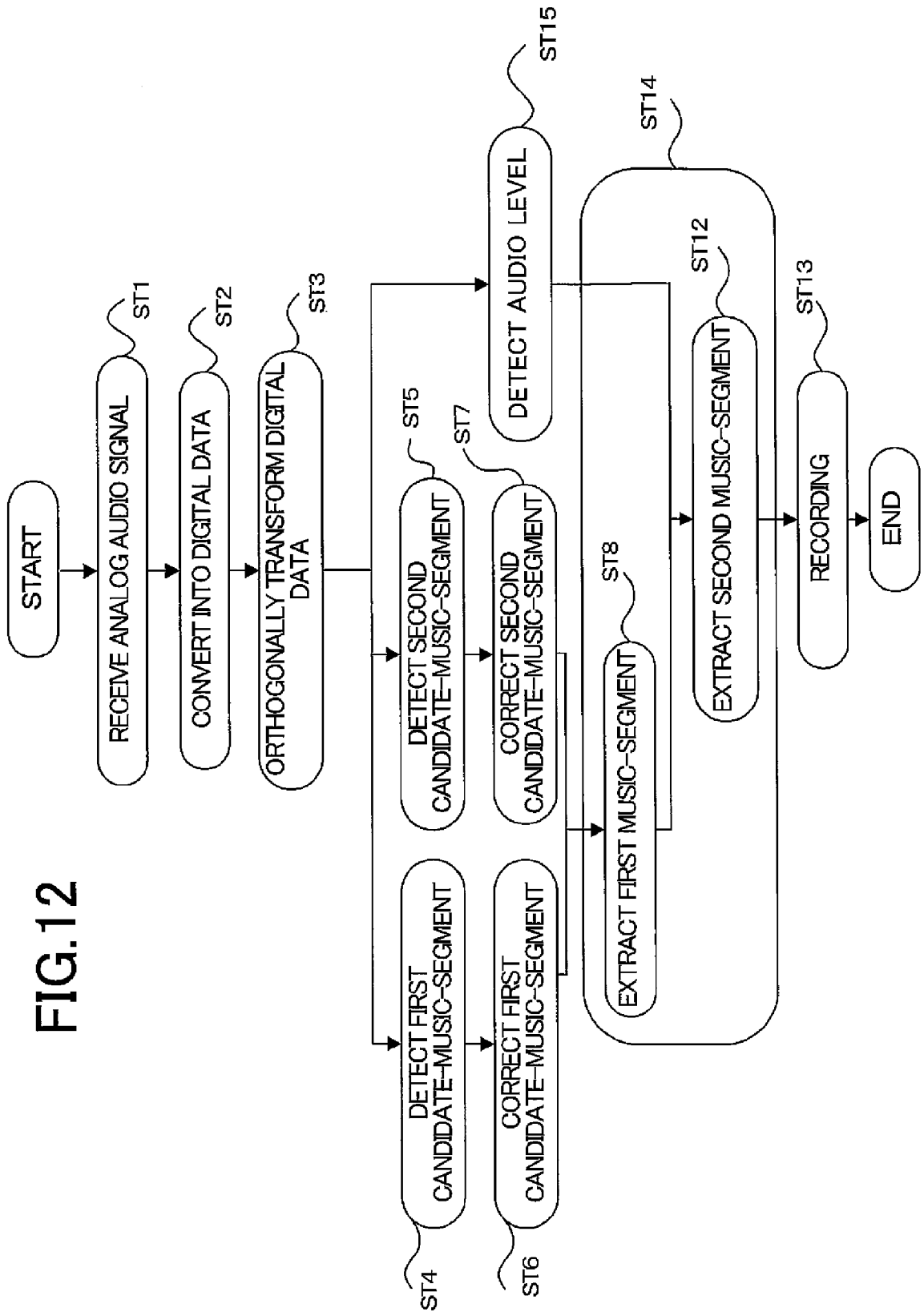
FIG. 12 is a flow chart illustrating a method of detecting and recording a music segment, according to Embodiment 2.

Embodiment 2 features in that a scene change point is detected using information on an audio signal. FIG. 11 is a block diagram illustrating a system of an audio/video recording device 2001 of Embodiment 2, and FIG. 12 is a flow chart showing a method of detecting and recording a music segment according to Embodiment 2. The audio/video recording device 2001 is provided with an audio-level detection unit 80 for detecting a scene change point based on an audio signal 4 of a television broadcast and the like to be recorded (ST 15). The audio-level detection unit 80 detects from an audio-level change a scene change point that is a conversation break point and the like, to output into the second music-segment detection unit 17 the time position at the occurrence of the scene change point as time information such as a presentation time (PTM). A configuration other than the above are the same as those described in Embodiment 1; hence its explanation is omitted here.

<Audio-Level Detection Unit>

Figure 13:
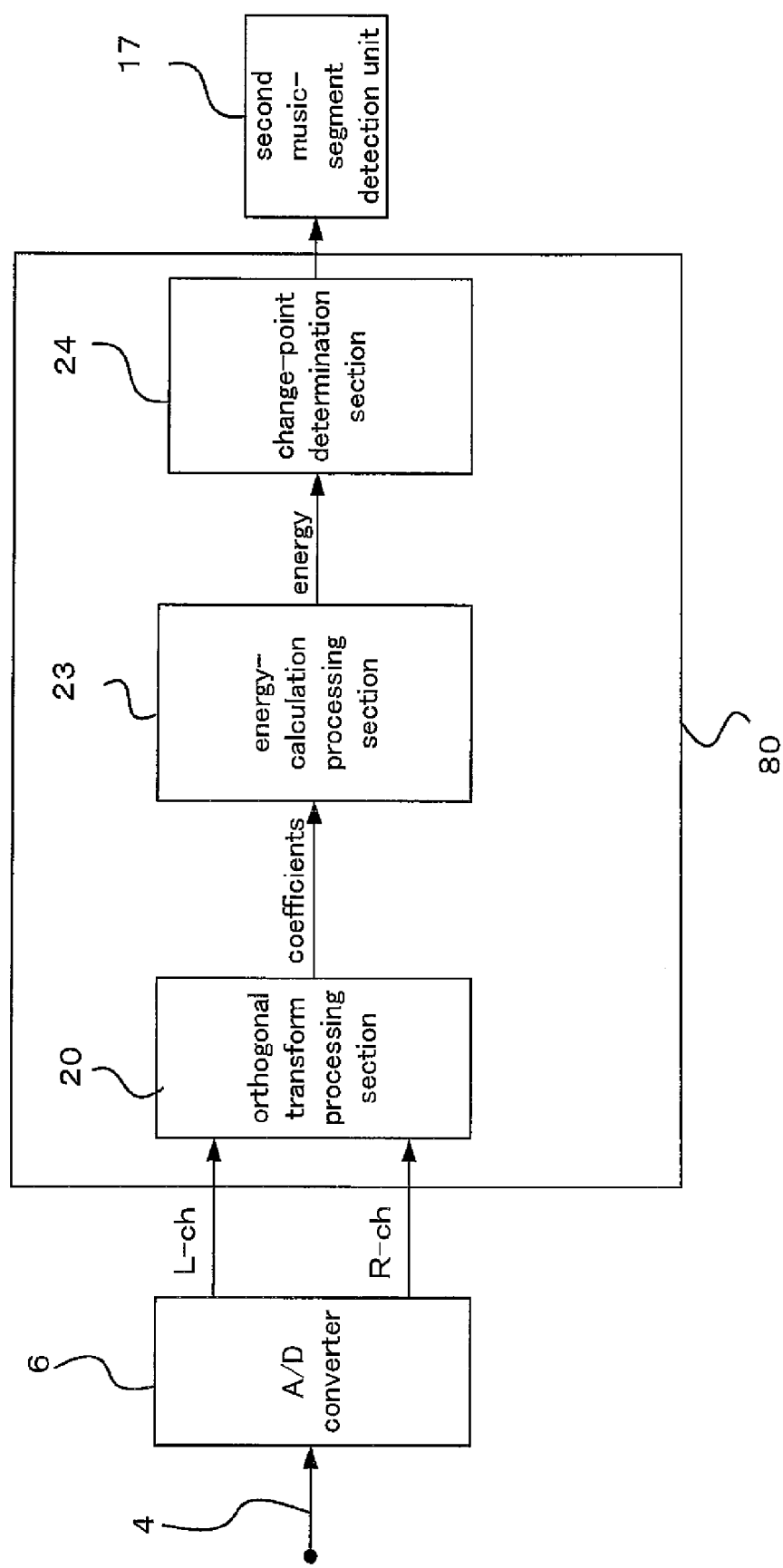
FIG. 13 is a block diagram illustrating an audio-level detection unit of Embodiment 2.

FIG. 13 is a block diagram illustrating in detail a function of the audio-level detection unit 80 (ST15) of Embodiment 2. The audio-level detection unit 80 is configured with an orthogonal transform processing section 20, an energy-calculation processing section 23, and a change-point determination section 24.

Next, functions of each constitution section are explained. The orthogonal transform processing section 20 calculates orthogonal transform coefficients for audio digital signals converted by the A/D converter 6. The energy-calculation processing section 23 calculates an energy of the audio signal from the calculated coefficients. Finally, the change-point determination section 24 detects a change point from variations of the energy, to output the change point to the second music-segment detection unit 17.

A process of detecting a scene change point by the audio-level detection unit 80 is explained in detail with reference to FIG. 13. Firstly, when the input audio signal 4 consists of stereo signals, PCM data is obtained separately for the right and left channels in the A/D converter 6. The PCM data, when used in, for example, recorders for consumer use, have such a quality of a sampling frequency of 48 kHz and a quantization bit count of 16 bits.

Next, in the orthogonal transform processing section 20, the PCM data is orthogonally transformed from the time domain to the frequency domain. For example, a modified discrete cosine transformation (MDCT) is used for the orthogonal transformation. When sampling 512 items of the PCM data using the MDCT, 256 orthogonal transform coefficients (MDCT coefficients), i.e., coefficient matrixes each having 256 dimensions are calculated for the right and left channels each.

The energy-calculation processing section 23 calculates an energy of the audio signal using the orthogonal transform coefficients calculated by the orthogonal transform processing section 20. The energy is obtained by calculating the sum of squares of the orthogonal transform coefficients. Note that, at that time, an energy of the audio signal in specific frequency bands may be calculated not using all the coefficients of 256 dimensions but using only specific coefficients thereamong. Elements of the 256-dimension coefficient matrix each correspond to a tone in a frequency band. Accordingly, an energy corresponding to human voice can be calculated using, for example, orthogonal transform coefficients corresponding to a frequency band of 200 Hz-400 kHz that is the dominant frequency band of human voice.

The energy obtained in the energy calculation processing section 23 is output to the change-point determination section 24. Defining, as a scene change point based on a conversation break point, a situation whose energy state is lower than a certain value (threshold) is continuously detected for a certain period (for example, 200 milliseconds), the change-point determination section 24 evaluates the input audio signal 4 to detect a scene change point.

For example, as described above, when a change point is detected by calculating an energy using an orthogonal transform coefficient matrix corresponding to the frequency band of human voice, the change point can be regarded as a conversation break point. Since music such as background music contains wide range frequency components, the music contains a certain tone even, when the human-voice frequency band is noted, as described above. Accordingly, by employing a threshold taking account of such offset for the detection of a scene change point, a conversation break point can be detected. The detected scene-break point is output as time information such as a presentation time (PTM) by which the time position when the scene change occurs can be specified.

In addition, when noise can be estimated in advance to be generated at a specific frequency, a sum of squares may be calculated with omission of coefficients corresponding to the frequency in the energy calculation processing of the energy calculation processing unit 23. When recording, for example, NTSC broadcasting, noise may sometimes be generated, depending on reception environment, in an audio signal due to a crosstalk with the vertical scan frequency of 60 Hz or the horizontal scan frequency of 15.75 kHz. In order to eliminate influence of such a specific frequency noise, a filter processing such as decreasing or masking MDCT coefficients corresponding to the frequency band is performed. Note that such filter processing can also be performed in an audio identifying process in the first candidate-music-segment detection unit 10 and the second candidate-music-segment detection unit.

While in Embodiment 2, the method using an energy calculated from audio data is explained as a method of detecting a scene change point from the audio signal 4, a detecting method is not limited to this. For example, a method may be used in which, by directly acquiring the analog audio signal 4 without through the A/D converter 6, a scene change point is detected from the amplitude of the signal. In addition, an analog audio signal having only a specific frequency band can be extracted from the analog audio signal 4 by using a band-pass filter circuit. Then, a method may be used in which an input analog audio signal having passed through the band-pass filter is split into two levels with respect to a reference level as a threshold using a comparator, and the output of the comparator is monitored by a microcomputer, to count the time position when a scene change occurs and its duration time by a timer.

Figure 14:
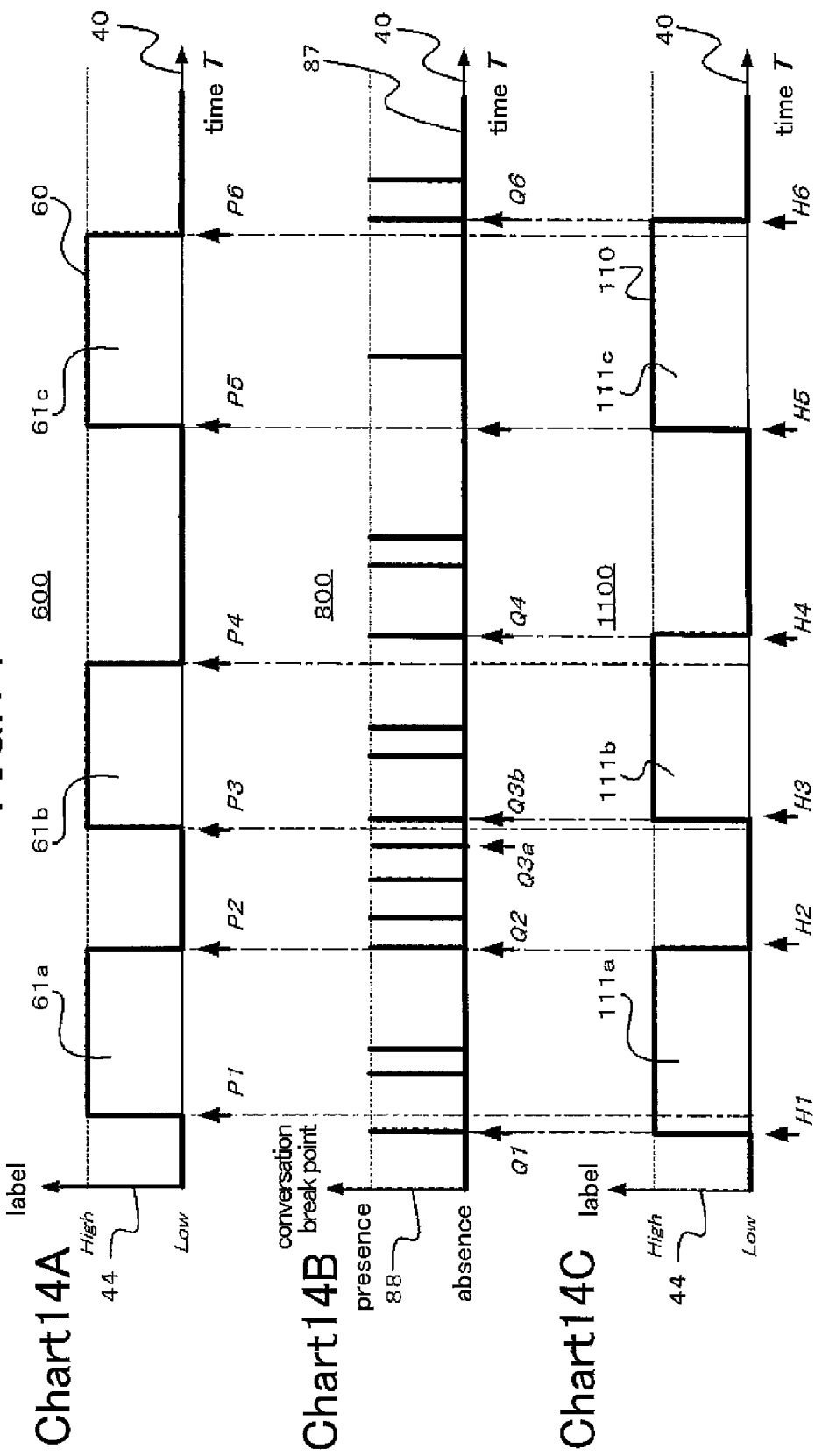
FIG. 14 shows charts illustrating a process of detecting a second music-segment, according to Embodiment 2.

FIG. 14 shows charts illustrating a processing of the second music-segment detection unit 17 of Embodiment 2: it shows charts illustrating a process of correcting the start and end points of a first music-segment detected by the first music-segment detection unit 16 using a scene break point obtained by the audio-level detection unit 80 (ST12 in FIG. 12). Chart 14A in the figure is a graph 600 in which the labels 60 are plotted that indicate music segments detected by the first music-segment detection unit 16. For a method of the detection process, the method explained in Embodiment 1 is used. Chart 14B in the figure is a graph 800 in which labels 87 are plotted that indicate time positions of conversation break points as an example of scene change points detected by the audio-level detection unit 80, and the horizontal axis denotes elapsed time 40 of a recorded program and the vertical axis 88 denotes the presence or absence of a conversation break point. Chart 8C in the figure is a graph 1100 that represents second music-segments, in which labels 110 are plotted that are obtained by correcting, using the labels 87 representing the time positions of conversation break points, the labels 60 representing the first music-segments. In both graphs 600 and 1100, segments assigned with the label indicating music and segments assigned with the label indicating non-music are expressed by the label axis 44 as "High" and "Low", respectively.

The process of detecting a music segment using a scene change point, in the second music-segment detection unit 17 is explained with reference to FIG. 14. In general, there is a scene such as an introduction of a music piece by the host, and then the music starts: a break point of conversation occurs between a music segment and a non music segment. By thus using a conversation break point for the start or end points of the music segment, the start and end points of a music segment can be accurately extracted.

The explanation is made on a case as an example in which the first music-segments 61a, 61b, and 61c have been detected from the labels 60. The second music-segment detection unit 17 determines the start and end points of the music segments using the times of conversation break points that occur around the start or end points P1, P2, P3, P4, P5, and P6 of the music segments. The correction process of the start and end points is the same as that explained in Embodiment 1; hence the explanation of the process is omitted here.

In this way, a second music-segment that is a definitive music-segment is determined using a break point of conversation. Thereby, without using video data that involves a high computational load due to large amounts of data, the start and end points of a music segment can be accurately extracted using audio data only.

Moreover, since thus determining a music segment eliminates a playback from starting from or ending at an intermediary in a conversation, a playback result can be obtained that gives no such feelings of something strange that the conversation is interrupted not to guess its contents.

Embodiment 3

Figure 15:
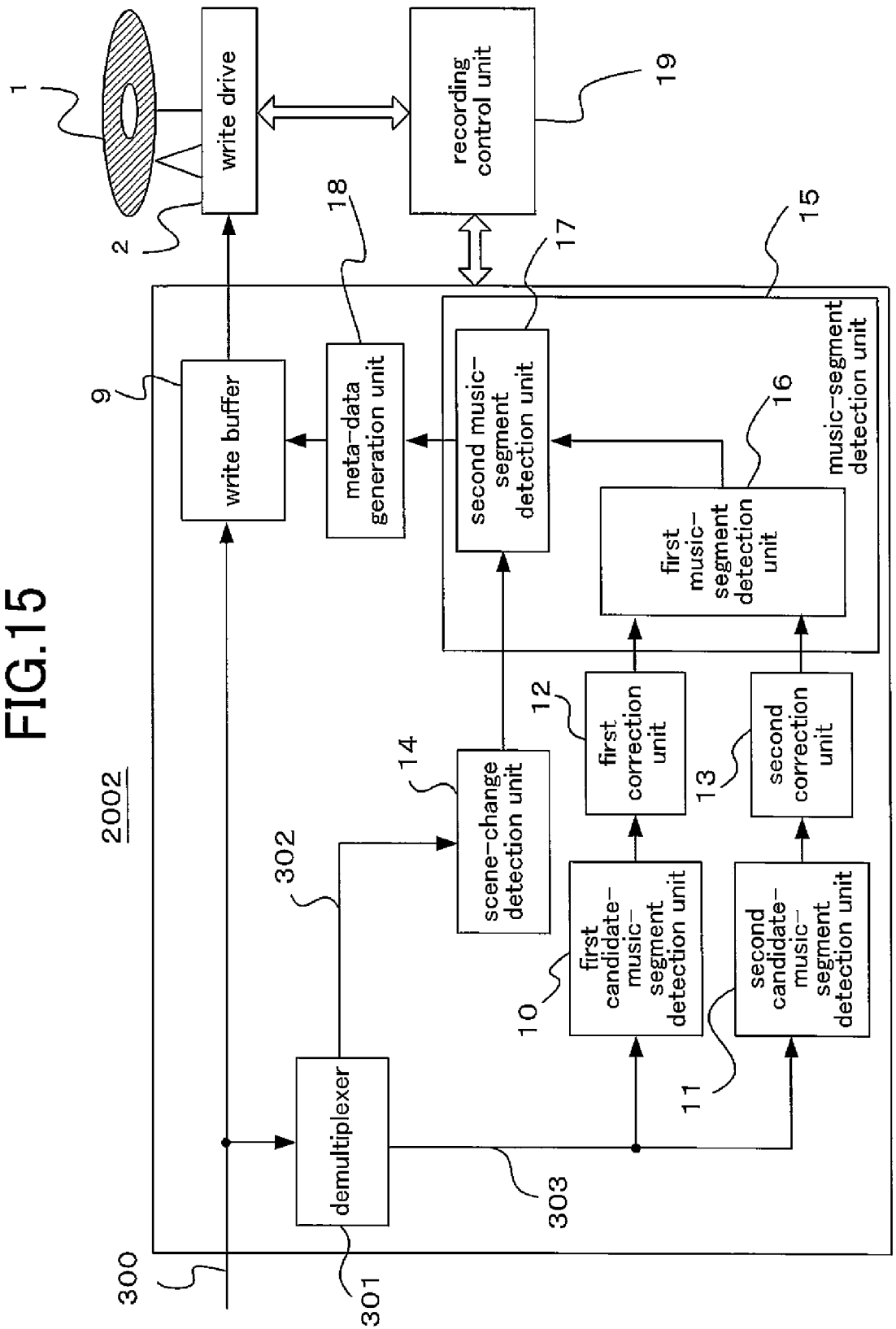
FIG. 15 a block diagram illustrating a system of an audio/video recording device of Embodiment 3.

In Embodiment 3, an explanation will be made on a case of television broadcasting being a digital broadcasting. FIG. 15 is a block diagram illustrating a system of an audio/video recording device 2002 according to Embodiment 3. When television broadcasting is a digital broadcasting such as a terrestrial digital broadcasting, a broadcasting-satellite digital broadcasting, and a communication-satellite digital broadcasting, a signal input into the device is superimposed with video data and audio data, and is compression-encoded. Accordingly, a digital broadcasting signal 300 is split into video data 302 and audio data 303 by a demultiplexer 301. The split audio data 302 is analyzed in the scene-change detection unit 14. The detection of a candidate music-segment is performed for the split audio data 303 in the first and second candidate-music-segment detection units 10 and 11. Since the digital broadcasting signal 300 has already been digital data, it is stored in the storage media 1 by the write drive 2 via the write buffer memory 9. A configuration other than this is the same as that of Embodiment 1; hence its explanation is omitted here.

Next, a process in the demultiplexer 301 is explained. In a case of, for example, a terrestrial digital broadcasting, the demultiplexer 301 splits data, which is superimposed with video data and audio data and is compression-encoded as an MPEG-2 transport stream (MPEG-2 TS), into, for example, the MPEG-2 format video data 302 and MPEG-2 audio format (advanced audio coding: AAC) audio data 303, to output them. At that time, the audio data 303 is subject to a decoding process to be output in a PCM format (for example, in a quality of a sampling frequency of 48 kHz and a quantization bit count of 16 bits), whereby the subsequent process can be performed similarly to Embodiment 1.

Meanwhile, in compression-encoding an audio signal, a transform process from the time domain to the frequency domain is often performed in order to improve its encoding efficiency. For that reason, information in the frequency domain is included in the compression-encoded audio signal. For example, if the audio data is in the MPEG-2 audio format (ACC), an MDCT is executed as the transform process to the frequency domain. Hence, orthogonal transform coefficients may be calculated directly from the compression-encoded audio data in the orthogonal transform processing sections 20 of the first and second candidate-music-segment detection units 10 and 11 by extracting information in the frequency domain.

In this way, by configuring such a device as shown in FIG. 15, when receiving and recording video data and audio data, which are compression-encoded and superimposed with each other, from a digital broadcasting such as a terrestrial digital broadcasting, a broadcasting-satellite digital broadcasting, and a communication-satellite digital broadcasting, not only a music segment can be detected while ensuring a high accuracy, but also a series of music-scenes can be detected, with scene break points for a viewer to feel nothing strange being as the start points and the end points of the scenes.

Embodiment 4

Figure 16:
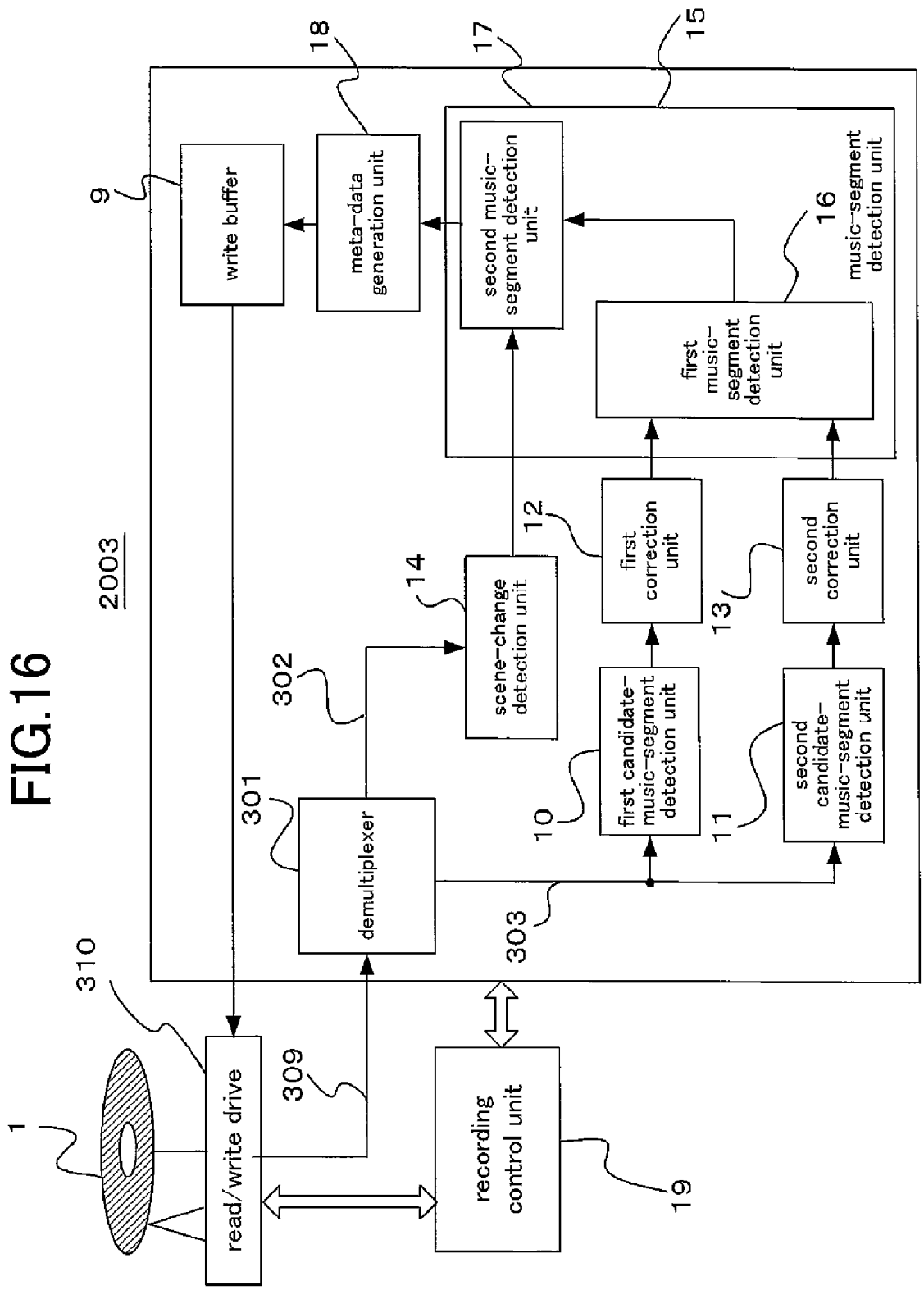
FIG. 16 a block diagram illustrating a system of an audio/video recording device of Embodiment 4.

Embodiment 4 features in that an input is not a television broadcast but compression-encoded video/audio data having been recorded in the removable storage media 1. FIG. 16 is a block diagram illustrating a system of a video/audio recoding device 2003 of Embodiment 4. Video/audio data 309 has been recorded in the storage media 1 in advance, and the data is read out by a read/write drive 310, to be input into the demultiplexer 301. In addition, the storage media 1 may be a hard disk drive (HDD) and the like in which the video/audio data has been recorded, and the video/audio data 309 is, for example, an MPEG-2 program stream (MPEG-2 PS) and the like. The recording control unit 19 systematically manages and controls the operations of the video/audio recoding device 2003 and the read/write drive 310. A meta-data file for a music segment detected by the second music-segment detection unit 17, which data represents time information on the music segment, is created in the meta-data generation unit 18, to be recorded into the storage media 1 via the write buffer memory 9. At that time, the meta-data file is preferably recorded as additional data without rewriting the video/audio data having been recorded in the storage media 1. A configuration other than the above is the same as that described in Embodiment 1 or in Embodiment 3; hence, its explanation is omitted here.

The above-described method does not need to perform the process of detecting a music segment in real time at recoding. Accordingly, even when a recording control unit has a not-so-high processing power, a music segment can be detected by taking time after recording as well as can be detected while ensuing a high accuracy, from a program having been recoded in the storage media 1, which allows a series of music-scenes to be also detected, with scene break points for a viewer to feel nothing strange being as the start point and the end points of the scenes.

In addition, while the candidate music-segment detection means and the correction means are configured as individual means in Embodiment 1 through Embodiment 4, the functions of these two means may be incorporated into one candidate-music-segment detection means.

Furthermore, while, in Embodiment 1 through Embodiment 4, multimedia data including a music segment is recorded, multimedia data of detected music segments only may be recorded.

What is claimed is:

1. A music-segment detection method comprising:
inputting data including an audio signal and a video signal;
detecting a first candidate music-segment, based on a frequency characteristic of the audio signal;
detecting a second candidate-music-segment, based on a difference in a plurality of audio channels of the audio signal;
detecting a scene change point in the data;
extracting a first music-segment including a start time of the second candidate-music-segment and an end time of the second candidate-music-segment, the start time of the second candidate-music-segment being detected around a start time of the first candidate-music-segment, the end time of the second candidate-music-segment being detected around an end time of the first candidate-music-segment; and
determining a second music-segment by correcting a start time of the first music-segment, based on the scene change point existing around the start time of the first music-segment, and an end time of the first music-segment, based on the scene change point existing around the end time of the first music-segment.

2. A data recording method comprising:
recording data including a music segment detected by a music-segment detection method as recited in claim 1, wherein time information on the music segment is recorded.

3. A music-segment detection method as recited in claim 1, wherein the scene change point is detected when a difference value in Y, U, and V components between two frames of the video signal is equal to or larger than a predetermined threshold.

4. A data recording method comprising:
recording data including a music segment detected by a music-segment detection method as recited in claim 3, wherein time information on the music segment is recorded.

5. A music-segment detection method as recited in claim 1, wherein the scene change point is detected when a situation in which an energy state of the audio signal is lower than a certain value is continuously detected for a certain period.

6. A data recording method comprising:
recording data including a music segment detected by a music-segment detection method as recited in claim 5, wherein time information on the music segment is recorded.

7. A music-segment detection device comprising:
one or more processing devices programmed to:
input data including an audio signal and a video signal;
detect a first candidate-music-segment, based on a frequency characteristic of the audio signal;
detect a second candidate-music-segment, based on a difference in a plurality of audio channels of the audio signal;
detect a scene change point in the data;
extract a first music-segment including a start time of the second candidate-music-segment and an end time of the second candidate-music-segment, the start time of the second candidate-music-segment being detected around a start time of the first-candidate-music segment, the end time of the second candidate-musicsegment being detected around an end time of the first candidate-music-segment; and determine a second music-segment by correcting a start time of the first music-segment, based on the scene change point existing around the start time of the first music-segment, and an end time of the first music-segment, based on the scene change point existing around the end time of the first music-segment.

8. A data recording device comprising:

a data recording unit for recording data including a music segment detected by a music-segment detection device as recited in claim 7, wherein the data recording unit records time information on the music segment.

9. A music-segment detection device as recited in claim 7, wherein the scene change point is detected when a difference value in Y, U, and V components between two frames of the video signal is equal to or larger than a predetermined threshold.

10. A data recording device comprising:

a data recording unit for recording data including a music segment detected by a music-segment detection device as recited in claim 9, wherein the data recording unit records time information on the music segment.

11. A music-segment detection device as recited in claim 7, wherein the scene change point is detected when a situation in which energy state of the audio signal is lower than a certain value is continuously detected for a certain period.

12. A data recording device comprising:

a data recording unit for recording data including a music segment detected by a music-segment detection device as recited in claim 11, wherein the data recording unit records time information on the music segment.

* * * * *